(12) United States Patent
Rodriguez et al.

(10) Patent No.: US 8,416,859 B2
(45) Date of Patent: Apr. 9, 2013

(54) SIGNALLING AND EXTRACTION IN COMPRESSED VIDEO OF PICTURES BELONGING TO INTERDEPENDENCY TIERS

(75) Inventors: Arturo A. Rodriguez, Norcross, GA (US); Benjamin M. Cook, Flowery Branch, GA (US)

(73) Assignee: Cisco Technology, Inc., San Jose, CA (US)

( * ) Notice: Subject to any disclaimer, the term of this patent is extended or adjusted under 35 U.S.C. 154(b) by 999 days.

(21) Appl. No.: 12/124,779

(22) Filed: May 21, 2008

(65) Prior Publication Data

US 2008/0260045 A1  Oct. 23, 2008

Related U.S. Application Data

(63) Continuation-in-part of application No. 11/831,916, filed on Jul. 31, 2007, and a continuation-in-part of application No. 11/627,452, filed on Jan. 26, 2007.

(60) Provisional application No. 60/865,644, filed on Nov. 13, 2006, provisional application No. 61/007,074, filed on Dec. 11, 2007, provisional application No. 61/013,209, filed on Dec. 12, 2007, provisional application No. 61/032,478, filed on Feb. 29, 2008.

(51) Int. Cl.
 *H04N 11/04* (2006.01)
(52) U.S. Cl. .............................. 375/240.26; 375/240.01
(58) Field of Classification Search ............. 375/240.01, 375/240.03, 240.12, 240.19, 240.25, 240.26
See application file for complete search history.

(56) References Cited

U.S. PATENT DOCUMENTS

| | | | |
|---|---|---|---|
| 4,764,805 A | 8/1988 | Rabbani et al. |
| 5,440,345 A | 8/1995 | Shimoda |
| 5,606,359 A | 2/1997 | Youden et al. |
| 5,734,443 A | 3/1998 | O'Grady |
| 5,734,783 A | 3/1998 | Shimoda et al. |
| 5,828,370 A | 10/1998 | Moeller et al. |
| 5,854,873 A | 12/1998 | Mori et al. |
| 5,917,830 A | 6/1999 | Chen et al. |
| 5,917,988 A | 6/1999 | Eto |
| 5,943,447 A | 8/1999 | Tkhor et al. |
| 5,949,948 A | 9/1999 | Krause et al. |
| 5,963,260 A | 10/1999 | Bakhmutsky |

(Continued)

FOREIGN PATENT DOCUMENTS

| EP | 0 812 112 A2 | 12/1997 |
|---|---|---|
| EP | 1 292 138 A2 | 3/2003 |

(Continued)

OTHER PUBLICATIONS

Stuhlmuller, Klaus, et al., "Analysis of Video Transmission over Lossy Channels"; IEEE Journal on Selected Areas in Communication, vol. 18, No. 6, Jun. 2000, pp. 1012-1032.

(Continued)

*Primary Examiner* — Hassan Kizou
*Assistant Examiner* — Emmanuel Maglo
(74) *Attorney, Agent, or Firm* — Merchant & Gould

(57) ABSTRACT

In one embodiment, a method comprises providing a video stream, and providing information identifying compressed pictures in the video stream corresponding to respective picture interdependency tiers.

14 Claims, 14 Drawing Sheets

U.S. PATENT DOCUMENTS

| | | | |
|---|---|---|---|
| 5,970,028 A | 10/1999 | Shimabukuro | |
| 6,144,375 A | 11/2000 | Jain et al. | |
| 6,160,889 A | 12/2000 | Yagasaki | |
| 6,188,436 B1 | 2/2001 | Williams et al. | |
| 6,201,927 B1 | 3/2001 | Commer | |
| 6,222,979 B1 | 4/2001 | Willis et al. | |
| 6,304,714 B1 | 10/2001 | Krause et al. | |
| 6,310,915 B1 | 10/2001 | Wells et al. | |
| 6,393,057 B1 | 5/2002 | Thoreau et al. | |
| 6,411,725 B1 | 6/2002 | Rhoads | |
| 6,421,387 B1 | 7/2002 | Rhee | |
| 6,512,552 B1 | 1/2003 | Subramanian | |
| 6,587,506 B1 | 7/2003 | Noridomi et al. | |
| 6,594,798 B1 | 7/2003 | Chou et al. | |
| 6,643,327 B1 | 11/2003 | Wang | |
| 6,658,199 B1 | 12/2003 | Hallberg | |
| 6,754,373 B1 | 6/2004 | de Cuetos et al. | |
| 6,806,909 B1 | 10/2004 | Radha et al. | |
| 6,906,743 B1 * | 6/2005 | Maurer | 348/180 |
| 6,907,075 B2 * | 6/2005 | Felts et al. | 375/240.19 |
| 6,909,743 B1 | 6/2005 | Ward et al. | |
| 6,912,251 B1 | 6/2005 | Ward et al. | |
| 6,980,594 B2 * | 12/2005 | Wang et al. | 375/240.12 |
| 7,027,713 B1 | 4/2006 | Hallberg | |
| 7,050,603 B2 | 5/2006 | Rhoads et al. | |
| 7,053,874 B2 | 5/2006 | Koyama | |
| 7,085,322 B2 | 8/2006 | Ngai et al. | |
| 7,095,783 B1 * | 8/2006 | Sotheran et al. | 375/240.01 |
| 7,096,481 B1 | 8/2006 | Forecast et al. | |
| 7,129,962 B1 | 10/2006 | Cote et al. | |
| 7,185,018 B2 | 2/2007 | Archbold | |
| 7,236,520 B2 | 6/2007 | Kim et al. | |
| 7,239,801 B2 | 7/2007 | Himeno et al. | |
| 7,243,193 B2 | 7/2007 | Walmsley | |
| 7,317,839 B2 | 1/2008 | Holcomb | |
| 7,376,335 B2 | 5/2008 | De Haan | |
| 7,397,858 B2 | 7/2008 | Garrido et al. | |
| 7,480,335 B2 | 1/2009 | Payson | |
| 7,577,198 B2 | 8/2009 | Holcomb | |
| 7,584,495 B2 | 9/2009 | Hannuksela et al. | |
| 7,586,924 B2 | 9/2009 | Wiegand | |
| 7,590,180 B2 | 9/2009 | Kang | |
| 7,599,435 B2 | 10/2009 | Marpe et al. | |
| 7,599,438 B2 | 10/2009 | Holcomb | |
| 7,606,308 B2 | 10/2009 | Holcomb | |
| 7,616,692 B2 | 11/2009 | Holcomb | |
| 7,620,106 B2 | 11/2009 | Holcomb | |
| 7,623,574 B2 | 11/2009 | Holcomb | |
| 7,649,937 B2 | 1/2010 | Rabenold et al. | |
| 7,656,410 B2 | 2/2010 | Chiu | |
| 7,733,956 B1 | 6/2010 | Kalra et al. | |
| 7,809,059 B2 | 10/2010 | Yin et al. | |
| 7,809,060 B2 | 10/2010 | Toma et al. | |
| 7,889,788 B2 | 2/2011 | Toma et al. | |
| 7,903,743 B2 | 3/2011 | Ho | |
| 7,912,219 B1 | 3/2011 | Michener et al. | |
| 8,155,207 B2 | 4/2012 | Rodriguez et al. | |
| 2002/0071485 A1 | 6/2002 | Caglar et al. | |
| 2002/0075402 A1 | 6/2002 | Robson et al. | |
| 2002/0133819 A1 | 9/2002 | Jackson | |
| 2002/0149591 A1 | 10/2002 | Van Der Vleuten et al. | |
| 2002/0162111 A1 | 10/2002 | Shimizu et al. | |
| 2002/0176025 A1 | 11/2002 | Kim | |
| 2002/0178444 A1 | 11/2002 | Trajkovic et al. | |
| 2003/0012554 A1 | 1/2003 | Zeidler et al. | |
| 2003/0016876 A1 | 1/2003 | Chai et al. | |
| 2003/0043847 A1 | 3/2003 | Haddad | |
| 2003/0067479 A1 | 4/2003 | Jung et al. | |
| 2003/0072555 A1 | 4/2003 | Yap et al. | |
| 2003/0081934 A1 | 5/2003 | Kirmuss | |
| 2003/0093418 A1 | 5/2003 | Archbold | |
| 2003/0093800 A1 | 5/2003 | Demas et al. | |
| 2003/0113098 A1 | 6/2003 | Willis | |
| 2003/0123849 A1 | 7/2003 | Nallur | |
| 2003/0161407 A1 | 8/2003 | Murdock et al. | |
| 2003/0189982 A1 | 10/2003 | MacInnis | |
| 2004/0012510 A1 * | 1/2004 | Chen | 341/50 |
| 2004/0028227 A1 | 2/2004 | Yu | |
| 2004/0078186 A1 | 4/2004 | Nair | |
| 2004/0128578 A1 | 7/2004 | Jonnalagadda | |
| 2004/0133908 A1 | 7/2004 | Smith et al. | |
| 2004/0139462 A1 | 7/2004 | Hannuksela et al. | |
| 2004/0177369 A1 | 9/2004 | Akins | |
| 2004/0179619 A1 | 9/2004 | Tian et al. | |
| 2004/0210925 A1 | 10/2004 | Miyazawa et al. | |
| 2004/0218816 A1 | 11/2004 | Hannuksela | |
| 2004/0230994 A1 | 11/2004 | Urdang et al. | |
| 2004/0257472 A1 * | 12/2004 | Mpr et al. | 348/565 |
| 2005/0002574 A1 | 1/2005 | Fukuhara et al. | |
| 2005/0013249 A1 | 1/2005 | Kong et al. | |
| 2005/0022245 A1 | 1/2005 | Nallur et al. | |
| 2005/0053134 A1 | 3/2005 | Holcomb | |
| 2005/0053140 A1 | 3/2005 | Holcomb | |
| 2005/0053141 A1 | 3/2005 | Holcomb | |
| 2005/0053142 A1 | 3/2005 | Holcomb | |
| 2005/0053143 A1 | 3/2005 | Holcomb | |
| 2005/0053144 A1 | 3/2005 | Holcomb | |
| 2005/0053155 A1 | 3/2005 | Holcomb | |
| 2005/0053295 A1 | 3/2005 | Holcomb | |
| 2005/0069212 A1 | 3/2005 | Bottreau et al. | |
| 2005/0123056 A1 | 6/2005 | Wang | |
| 2005/0175098 A1 | 8/2005 | Narasimhan et al. | |
| 2005/0190774 A1 | 9/2005 | Wiegand | |
| 2005/0207733 A1 | 9/2005 | Gargi | |
| 2005/0226323 A1 | 10/2005 | Secker | |
| 2005/0226327 A1 | 10/2005 | Kim | |
| 2005/0229225 A1 | 10/2005 | Klausberger et al. | |
| 2005/0254498 A1 | 11/2005 | Itoh | |
| 2005/0281329 A1 * | 12/2005 | Chin | 375/240.01 |
| 2006/0013305 A1 | 1/2006 | Sun | |
| 2006/0072597 A1 | 4/2006 | Hannuksela | |
| 2006/0083298 A1 | 4/2006 | Wang | |
| 2006/0083311 A1 | 4/2006 | Winger | |
| 2006/0093045 A1 | 5/2006 | Anderson et al. | |
| 2006/0093315 A1 | 5/2006 | Kelly et al. | |
| 2006/0117357 A1 | 6/2006 | Surline | |
| 2006/0126728 A1 | 6/2006 | Yu et al. | |
| 2006/0129914 A1 | 6/2006 | Ellis | |
| 2006/0132822 A1 | 6/2006 | Walmsley | |
| 2006/0133645 A1 | 6/2006 | Rhoads et al. | |
| 2006/0147121 A1 | 7/2006 | Maeda et al. | |
| 2006/0188169 A1 | 8/2006 | Tener et al. | |
| 2006/0222319 A1 | 10/2006 | Russ | |
| 2006/0224763 A1 | 10/2006 | Altunbasak et al. | |
| 2006/0262861 A1 | 11/2006 | Kobayashi | |
| 2006/0277566 A1 | 12/2006 | Vince et al. | |
| 2006/0294171 A1 | 12/2006 | Bossen | |
| 2007/0011447 A1 | 1/2007 | Murray et al. | |
| 2007/0019724 A1 | 1/2007 | Tourapis | |
| 2007/0030186 A1 | 2/2007 | Archbold | |
| 2007/0030356 A1 | 2/2007 | Yea | |
| 2007/0030818 A1 | 2/2007 | Bahnck et al. | |
| 2007/0031110 A1 | 2/2007 | Rijckaert | |
| 2007/0053665 A1 | 3/2007 | Kato | |
| 2007/0091997 A1 | 4/2007 | Fogg et al. | |
| 2007/0109409 A1 | 5/2007 | Yea | |
| 2007/0112721 A1 | 5/2007 | Archbold | |
| 2007/0116277 A1 | 5/2007 | Ro et al. | |
| 2007/0116426 A1 | 5/2007 | Toma et al. | |
| 2007/0121721 A1 | 5/2007 | Kim et al. | |
| 2007/0133674 A1 | 6/2007 | Garnier et al. | |
| 2007/0140358 A1 | 6/2007 | Schwartz et al. | |
| 2007/0147686 A1 | 6/2007 | Joshi | |
| 2007/0153679 A1 | 7/2007 | Jost et al. | |
| 2007/0172133 A1 | 7/2007 | Kim | |
| 2007/0183494 A1 * | 8/2007 | Hannuksela | 375/240.1 |
| 2007/0194975 A1 | 8/2007 | Jang et al. | |
| 2007/0223595 A1 | 9/2007 | Hannuksela et al. | |
| 2007/0230460 A1 | 10/2007 | Jeong et al. | |
| 2007/0230496 A1 | 10/2007 | Guo et al. | |
| 2007/0245382 A1 | 10/2007 | Doi et al. | |
| 2007/0280350 A1 * | 12/2007 | Mathew et al. | 375/240.03 |
| 2008/0025399 A1 | 1/2008 | Le Leannec et al. | |
| 2008/0037658 A1 | 2/2008 | Price et al. | |
| 2008/0037957 A1 | 2/2008 | Nallur et al. | |
| 2008/0055463 A1 | 3/2008 | Lerner | |
| 2008/0056383 A1 | 3/2008 | Ueki et al. | |

| | | |
|---|---|---|
| 2008/0063074 A1 | 3/2008 | Gallant et al. |
| 2008/0089422 A1 | 4/2008 | Karczewicz |
| 2008/0115175 A1 | 5/2008 | Rodriguez |
| 2008/0115176 A1 | 5/2008 | Rodriguez |
| 2008/0117985 A1 | 5/2008 | Chen |
| 2008/0127255 A1 | 5/2008 | Ress et al. |
| 2008/0131079 A1 | 6/2008 | Toma |
| 2008/0137742 A1 | 6/2008 | Chen |
| 2008/0141091 A1 | 6/2008 | Kalluri |
| 2008/0152005 A1 | 6/2008 | Oguz et al. |
| 2008/0152006 A1 | 6/2008 | Chen et al. |
| 2008/0163308 A1 | 7/2008 | Kim |
| 2008/0192817 A1 | 8/2008 | Llach et al. |
| 2008/0225850 A1 | 9/2008 | Oran et al. |
| 2008/0225951 A1 | 9/2008 | Young |
| 2008/0247463 A1 | 10/2008 | Buttimer |
| 2008/0256409 A1 | 10/2008 | Oran et al. |
| 2008/0273596 A1 | 11/2008 | Oguz et al. |
| 2008/0311869 A1 | 12/2008 | Koga et al. |
| 2008/0320558 A1 | 12/2008 | Imanishi et al. |
| 2009/0002379 A1 | 1/2009 | Baeza |
| 2009/0003439 A1 | 1/2009 | Wang et al. |
| 2009/0003446 A1 | 1/2009 | Wu |
| 2009/0003447 A1 | 1/2009 | Christoffersen |
| 2009/0016203 A1 | 1/2009 | Yahata et al. |
| 2009/0028247 A1 | 1/2009 | Suh |
| 2009/0034627 A1 | 2/2009 | Rodriguez et al. |
| 2009/0034633 A1 | 2/2009 | Rodirguez et al. |
| 2009/0041130 A1 | 2/2009 | Yoon et al. |
| 2009/0073928 A1 | 3/2009 | Power |
| 2009/0097568 A1 | 4/2009 | Karczewicz et al. |
| 2009/0100482 A1 | 4/2009 | Rodriguez et al. |
| 2009/0103635 A1 | 4/2009 | Pahalawatta |
| 2009/0109342 A1 | 4/2009 | Heng et al. |
| 2009/0116558 A1 | 5/2009 | Chen |
| 2009/0138668 A1 | 5/2009 | Blankenship |
| 2009/0141168 A1 | 6/2009 | Chen et al. |
| 2009/0147859 A1 | 6/2009 | McGowan et al. |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |
| 2009/0190849 A1 | 7/2009 | Huang |
| 2009/0199231 A1 | 8/2009 | Tsuria et al. |
| 2009/0207904 A1* | 8/2009 | Pandit et al. ............. 375/240.01 |
| 2009/0210412 A1 | 8/2009 | Oliver |
| 2009/0214178 A1 | 8/2009 | Takahashi |
| 2009/0220012 A1 | 9/2009 | Rodriguez et al. |
| 2009/0226105 A1 | 9/2009 | Huang |
| 2009/0262804 A1 | 10/2009 | Pandit |
| 2009/0279608 A1 | 11/2009 | Jeon |
| 2009/0296811 A1 | 12/2009 | Jeon |
| 2009/0310934 A1 | 12/2009 | Rodriguez |
| 2009/0313662 A1 | 12/2009 | Rodriguez |
| 2009/0313668 A1 | 12/2009 | Shepherd |
| 2009/0323822 A1 | 12/2009 | Rodriguez |
| 2010/0003015 A1 | 1/2010 | Rodriguez |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027417 A1 | 2/2010 | Franceschini et al. |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027667 A1 | 2/2010 | Samuelsson et al. |
| 2010/0027682 A1 | 2/2010 | Jeon |
| 2010/0118973 A1 | 5/2010 | Rodriguez et al. |
| 2010/0118974 A1 | 5/2010 | Rodriguez et al. |
| 2010/0118978 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0150232 A1 | 6/2010 | Nguyen et al. |
| 2010/0150234 A1 | 6/2010 | Koo et al. |
| 2010/0150527 A1 | 6/2010 | Sandoval |
| 2010/0195721 A1 | 8/2010 | Wu et al. |
| 2010/0215338 A1 | 8/2010 | Rodriguez |
| 2010/0218232 A1 | 8/2010 | Rodriguez |
| 2010/0241753 A1 | 9/2010 | Garbajs et al. |
| 2010/0292820 A1 | 11/2010 | Yahata et al. |
| 2010/0293571 A1 | 11/2010 | Rodriguez |
| 2010/0322302 A1 | 12/2010 | Rodriguez |
| 2011/0222837 A1 | 9/2011 | Walton et al. |

FOREIGN PATENT DOCUMENTS

| | | |
|---|---|---|
| EP | 1 328 119 A1 | 7/2003 |
| EP | 1 480 460 A1 | 11/2004 |
| JP | 05-236465 A | 9/1993 |
| KR | 10-2004-0054708 | 6/2004 |
| WO | WO 00/00981 A2 | 1/2000 |
| WO | WO 00/62552 A2 | 10/2000 |
| WO | WO 01/01702 | 1/2001 |
| WO | 01/43440 | 6/2001 |
| WO | 01/63774 | 8/2001 |
| WO | WO 2004/102571 A1 | 11/2004 |
| WO | WO 2005/106875 A1 | 11/2005 |
| WO | WO 2006/083824 A2 | 8/2006 |
| WO | 2006/101979 | 9/2006 |
| WO | WO 2006/114761 A1 | 11/2006 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

PCT Search Report cited in International Appln No. PCT/US2009/064180 mailed Jan. 8, 2010.

PCT Written Opinion cited in International Appln No. PCT/US2009/064180 mailed Jan. 8, 2010.

PCT Search Report cited in International Appln No. PCT/US2009/047521 mailed Dec. 22, 2009.

PCT Written Opinion cited in International Appln No. PCT/US2009/047521 mailed Dec. 22, 2009.

European Examination dated Sep. 16, 2010 in Application No. 08 796 875.6.

U.S. Non-Final Office Action in U.S. Appl. No. 11/627,452 dated Nov. 10, 2010.

U.S. Non-Final Office Action in U.S. Appl. No. 11/831,916 dated Aug. 4, 2010.

Canadian Office Action dated Dec. 11, 2009 in Application No. 2,533,169.

U.S. Final Office Action in U.S. Appl. No. 11/627,452 dated Mar. 4, 2011.

U.S. Non-Final Office Action in U.S. Appl. No. 11/831,916 dated Mar. 31, 2011.

U.S. Non-Final Office Action in U.S. Appl. No. 12/417,869 dated Apr. 4, 2011.

U.S. Appl. No. 12/709,851, filed Feb. 22, 2010 entitled "Signalling of Decodable Sub-Sequences", Inventor: Arturo A. Rodriguez.

U.S. Appl. No. 12/713,153, filed Feb. 25, 2010 entitled "Signalling of Auxiliary Information that Assists Processing of Video According to Various Formats", Inventors: Rodriguez et al.

U.S. Appl. No. 12/722,117, filed Mar. 11, 2010 entitled "Management of Picture Referencing in Video Streams for Plural Playback Modes", Inventors: Walton et al.

Hurst et al., "MPEG Splicing Tutorial and Proposed SMPTE Standard", Proceedings of the SMPTE Technical Conference, Nov. 1997, pp. 105-117.

International Preliminary Report on Patentability and Written Opinion dated Feb. 2, 2010 cited in International Application No. PCT/US2008/071111.

U.S. Non-Final Office Action dated Feb. 1, 2010 in U.S. Appl. No. 11/831,916.

U.S. Appl. No. 11/831,912, filed Jul. 21, 2007, entitled "Simultaneous Processing of Media Streams for Mitigating Impairments", inventor, Arturo A. Rodriguez.

U.S. Appl. No. 11/831,906, filed Jul. 21, 2007, entitled "Non-Enhancing Media Redundancy Coding for Mitigating Transmission Impairments", inventor, Arturo A. Rodriguez.

International Search Report and Written Opinion dated Apr. 15, 2010 cited in International Application No. PCT/US2010/024927.
European Examination dated May 4, 2010 in Application No. 07 844 937.8.
International Search Report and Written Opinion issued in International Application No. PCT/US2007/083867 mailed May 23, 2008.
MacInnis, A. et al., "NAL for AVC Video with MPEG-2 Systems," Video Standards and Drafts, pp. 1-11 (Mar. 2002).
U.S. Appl. No. 12/779,035, filed May 12, 2010 entitled "Signalling Buffer Characteristics for Splicing Operations of Video Streams", Inventors: Rodriguez et al.
U.S. Appl. No. 12/417,864, filed Apr. 3, 2009, entitled "System and Method for Authorization of Segment Boundary Notifications."
U.S. Appl. No. 12/492,117, filed Jun. 25, 2009, entitled "Support for Blocking Trick Mode Operations."
U.S. Appl. No. 12/483,925, filed Jun. 12, 2009, entitled "Picture Interdependencies Signals in Context of MMCO to Assist Stream Manipulation."
U.S. Appl. No. 12/417,868, filed Apr. 3, 2009, entitled "Segment Boundary Notification to a Digital Media Receiver."
U.S. Appl. No. 12/417,869, filed Apr. 3, 2009 entitled "System and Method for Processing Segment Boundary Notifications."
ITU-T Telecommunication Standardization Sector of ITU, Infrastructure of Audiovisual Services—Coding of Moving Video, "Advanced Video Coding for Generic Audiovisual Services", International Telecommunication Union, H.264, May 2003, XP008095420, 282 pages.
Tian et al., "Sub-Sequence Video Coding for Improved Temporal Scalability", 4 pages.
Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.
Amon et al., "File Format for Scalable Video Coding", IEEE Transactions on Circuits and Systems for Video Technology, vol. 17 No. 9, Sep. 2007, pp. 1174-1185.
ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I_PDF_E.pdf, XP007905991, pp. 1-76.
"Splice Points for MPEG-2 Transport Streams", SMPTE Journal, SMPTE Inc., vol. 107 No. Oct. 1998, XP-000793004, pp. 916-925.
Rodriguez et al., "SEI message to convey suitable splice points in the bitstream", JVT Meeting, Document JVT-Z040, Filename JVT-Z040.doc, XP-30007329, Jan. 2008, pp. 1-8.
Luo et al., "On HRD conformance for splice bitstreams", JVT Meeting, Document JVT-V055r1, Filename JVT-V055r1.doc, XP-30006863, Jan. 2007, pp. 1-11.
International Search Report dated Sep. 4, 2009 cited in International Application No. PCT/US2009/047237.
Written Opinion dated Sep. 4, 2009 cited in International Application No. PCT/US2009/047237.
International Search Report dated Sep. 4, 2009 cited in International Application No. PCT/US2009/044370.
Written Opinion dated Sep. 4, 2009 cited in International Application No. PCT/US2009/044370.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
U.S. Non-Final Office Action dated Dec. 28, 2007 in U.S. Appl. No. 10/623,683.
U.S. Final Office Action dated Jul. 25, 2008 in U.S. Appl. No. 10/623,683.
European Communication dated Aug. 9, 2011 in Application No. 08 838 787.3, 4 pages.
European Communication dated Sep. 22, 2011 in Application No. 08796584.4, 9 pages.
European Communication dated Dec. 14, 2011 in Application No. 09 751 294.1, 5 pages.
Chinese First Office Action mailed Dec. 31, 2011 in Application No. 200880121233.X, 7 pages.
Canadian Office Action dated Jun. 6, 2012 in Application No. 2,669,552, 3 pages.
European Communication dated Jul. 5, 2012 in Application No. 08838787.3, 6 pages.
Supplementary European Search Report dated Jul. 17, 2012 in Application No. 09826735, 3 pages.
Supplementary European Search Report dated Jul. 26, 2012 in Application No. 09767598, 7 pages.
U.S. Non-Final Office Action in U.S. Appl. No. 12/417,864 dated Apr. 18, 2011, 25 pages.
U.S. Final Office Action mailed Jul. 5, 2011 in U.S. Appl. No. 12/417,864, 13 pages.
U.S. Non-Final Office Action mailed Aug. 5, 2011 in U.S. Appl. No. 11/831,906, 38 pages.
U.S. Final Office Action mailed Aug. 5, 2011 in U.S. Appl. No. 12/417,869, 10 pages.
U.S. Non-Final Office Action mailed Sep. 22, 2011 in U.S. Appl. No. 11/831,912, 35 pages.
U.S. Final Office Action mailed Sep. 28, 2011 in U.S. Appl. No. 11/831,916, 44 pages.
U.S. Non-Final Office Action mailed Nov. 10, 2011 in U.S. Appl. No. 12/483,925, 36 pages.
U.S. Non-Final Office Action mailed Nov. 23, 2011 in U.S. Appl. No. 12/141,015, 30 pages.
U.S. Non-Final Office Action mailed Nov. 29, 2011 in U.S. Appl. No. 12/492,117, 35 pages.
U.S. Non-Final Office Action mailed Nov. 23, 2011 in U.S. Appl. No. 12/141,017, 32 pages.
U.S. Non-Final Office Action mailed Dec. 21, 2011 in U.S. Appl. No. 12/333,296, 30 pages.
U.S. Non-Final Office Action mailed Dec. 22, 2011 in U.S. Appl. No. 12/617,043, 34 pages.
U.S. Non-Final Office Action mailed Dec. 27, 2011 in U.S. Appl. No. 12/417,869, 8 pages.
U.S. Non-Final Office Action mailed Dec. 27, 2011 in U.S. Appl. No. 12/252,632, 31 pages.
U.S. Non-Final Office Action mailed Jan. 4, 2012 in U.S. Appl. No. 12/617,062, 30 pages.
U.S. Non-Final Office Action mailed Jan. 10, 2012 in U.S. Appl. No. 12/333,301, 37 pages.
U.S. Non-Final Office Action mailed Jan. 18, 2012 in U.S. Appl. No. 12/617,015, 31 pages.
U.S. Final Office Action mailed Feb. 17, 2012 in U.S. Appl. No. 11/627,452, 11 pages.
U.S. Non-Final Office Action mailed Mar. 8, 2012 in U.S. Appl. No. 12/351,776, 31 pages.
U.S. Final Office Action mailed Mar. 13, 2012 in U.S. Appl. No. 11/831,906, 24 pages.
U.S. Final Office Action mailed Mar. 19, 2012 in U.S. Appl. No. 11/831,912, 20 pages.
U.S. Non-Final Office Action mailed Mar. 26, 2012 in U.S. Appl. No. 12/395,676, 37 pages.
U.S. Non-Final Office Action mailed Apr. 23, 2012 in U.S. Appl. No. 12/709,851, 29 pages.
U.S. Non-Final Office Action mailed Apr. 25, 2012 in U.S. Appl. No. 12/141,019, 28 pages.
U.S. Final Office Action mailed May 11, 2012 in U.S. Appl. No. 12/141,015, 25 pages.
U.S. Final Office Action mailed May 18, 2012 in U.S. Appl. No. 12/492,117, 17 pages.
U.S. Non-Final Office Action mailed May 23, 2012 in U.S. Appl. No. 12/616,974, 30 pages.
U.S. Final Office Action mailed May 23, 2012 in U.S. Appl. No. 12/333,296, 21 pages.
U.S. Final Office Action mailed May 23, 2012 in U.S. Appl. No. 12/333,301, 18 pages.
U.S. Final Office Action mailed Jun. 11, 2012 in U.S. Appl. No. 12/141,017, 23 pages.

U.S. Final Office Action mailed Jun. 4, 2012 in U.S. Appl. No. 12/252,632, 22 pages.

U.S. Non-Final Office Action mailed Jun. 20, 2012 in U.S. Appl. No. 12/722,117, 30 pages.

U.S. Non-Final Office Action mailed Jun. 25, 2012 in U.S. Appl. No. 12/417,868, 37 pages.

U.S. Final Office Action mailed Jul. 6, 2012 in U.S. Appl. No. 12/617,043, 26 pages.

U.S. Non-Final Office Action mailed Jul. 10, 2012 in U.S. Appl. No. 12/417,869, 8 pages.

U.S. Final Office Action mailed Jul. 16, 2012 in U.S. Appl. No. 12/351,776, 6 pages.

U.S. Non-Final Office Action mailed Jul. 18, 2012 in U.S. Appl. No. 12/616,991, 25 pages.

U.S. Non-Final Office Action mailed Aug. 10, 2012 in U.S. Appl. No. 12/483,925, 35 pages.

\* cited by examiner

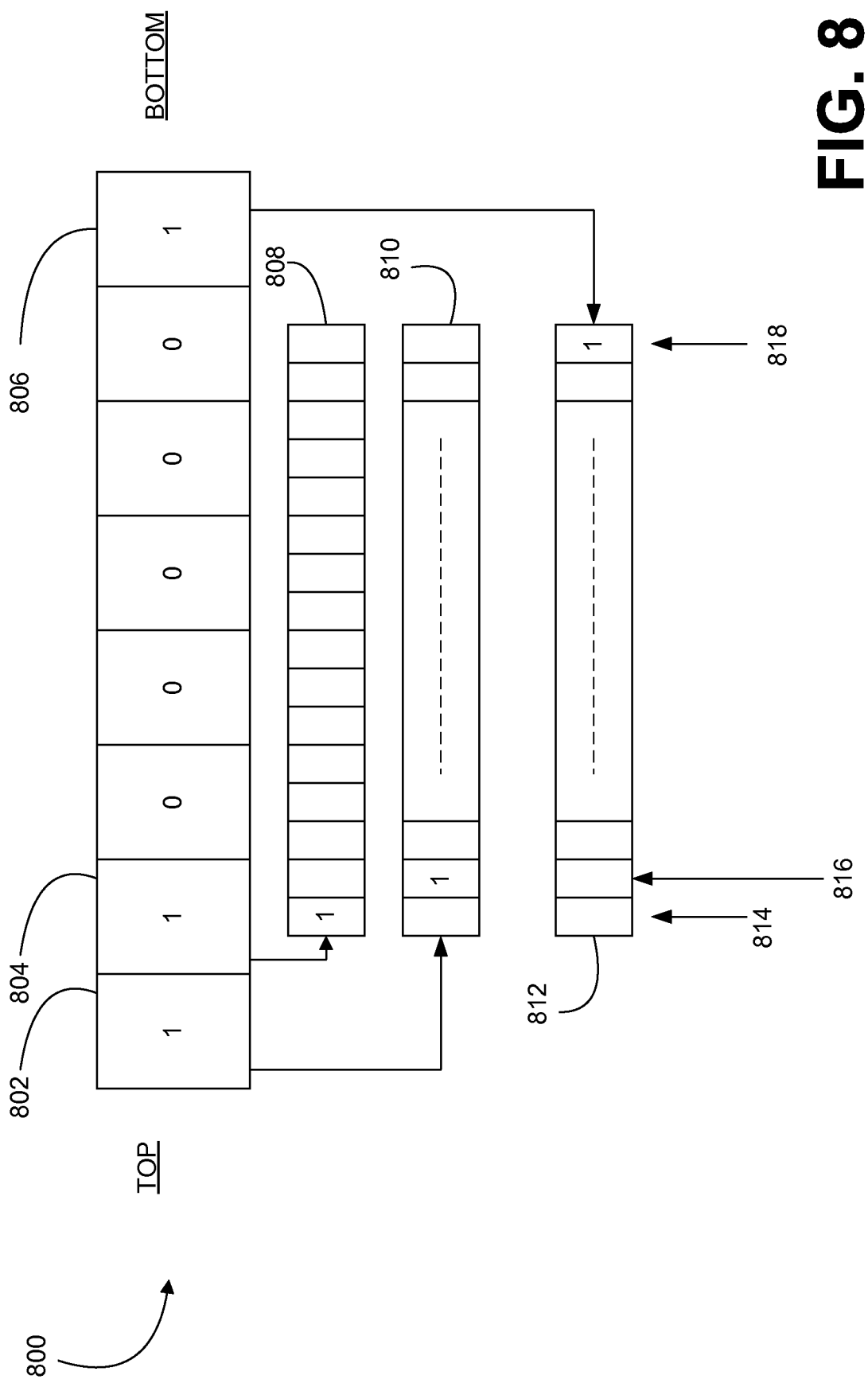

SIGNALLING AND EXTRACTION IN COMPRESSED VIDEO OF PICTURES BELONGING TO INTERDEPENDENCY TIERS

CROSS-REFERENCE TO RELATED APPLICATIONS

This application is a continuation-in-part of copending U.S. utility application entitled, "Indicating Picture Usefulness for Playback Optimization," having Ser. No. 11/831,916, filed Jul. 31, 2007, which claims priority to U.S. Provisional Application entitled, "System and Method for Signaling Characteristics of Pictures' Interdependencies," having Ser. No. 60/865,644, filed Nov. 13, 2006, both of which are entirely incorporated herein by reference.

This application is a continuation-in-part of copending U.S. utility application entitled, "System and Method for Signaling Characteristics of Pictures' Interdependencies," having Ser. No. 11/627,452, filed Jan. 26, 2007, which claims priority to U.S. Provisional Application entitled, "System and Method for Signaling Characteristics of Pictures' Interdependencies," having Ser. No. 60/865,644, filed Nov. 13, 2006, both of which are entirely incorporated herein by reference.

This application claims priority to copending U.S. provisional application entitled, "Communicating Auxiliary Information for PVR Functions," having Ser. No. 61/007,074, filed Dec. 11, 2007, copending U.S. provisional application entitled, "Video Processing With Tiered Interdependencies of Pictures," having Ser. No. 61/013,209, filed Dec. 12, 2007, and copending U.S. provisional application entitled, "Stream Identification," having Ser. No. 61/032,478, filed Feb. 29, 2008, all three of which are entirely incorporated herein by reference.

TECHNICAL FIELD

Particular embodiments are generally related to processing video streams in network systems.

BACKGROUND

The implementation of digital video with an advanced video compression method is expected to extend the same level of usability and functionality that established compression methods extend to applications and network systems. Video processing devices throughout the network systems should continue to be provisioned with existing levels of video stream manipulation capabilities or better.

When providing video stream manipulation functionality for video streams compressed and formatted in accordance with the Advanced Video Coding (AVC) standard, referred to herein as AVC streams, it becomes difficult to determine whether the video stream is suitable for a particular stream manipulation operation or for operations extending end user functionality such as different video playback modes. Likewise, it becomes difficult for video processing equipment located at any of several locations throughout a network system to fulfill manipulation operations on AVC streams. This is because the AVC standard generally has a rich set of compression tools and can exploit temporal redundancies among pictures in more elaborate and comprehensive ways than prior video coding standards.

AVC streams are more efficiently compressed than video streams coded with prior video coding standards. However, AVC streams tend to exhibit higher complexities in pictures' interdependencies that make it difficult to fulfill stream manipulation operations.

BRIEF DESCRIPTION OF THE DRAWINGS

FIG. 8 is a block diagram that illustrates an example embodiment of the data structure of FIG. 7.

DESCRIPTION OF EXAMPLE EMBODIMENTS

Overview

Figure 1:
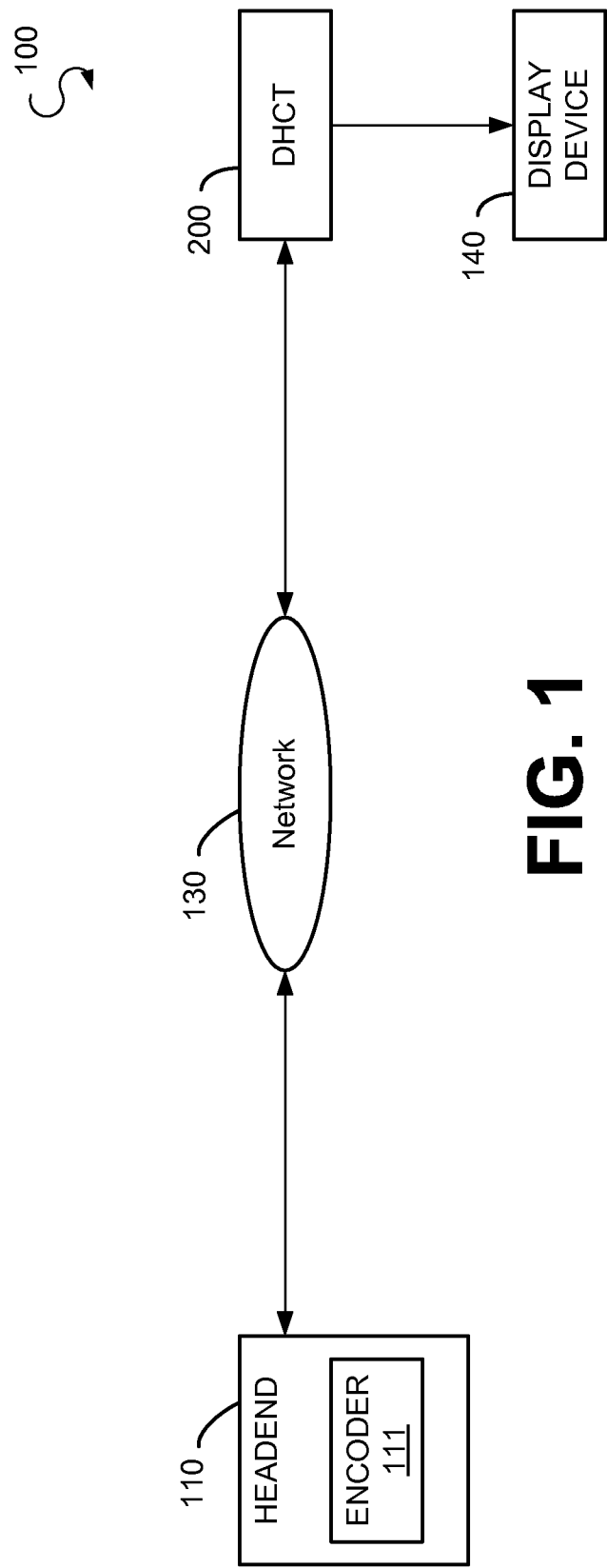
FIG. 1 is a high-level block diagram depicting an example environment in which an embodiment of systems and methods that implement processing of compressed video and information identifying pictures in respective picture interdependency tiers.

In one embodiment, a method comprises providing a video stream, and providing information identifying compressed pictures in the video stream corresponding to respective picture interdependency tiers. In another embodiment, a method comprises receiving a video stream, receiving information identifying compressed pictures in the video stream corresponding to respective picture interdependency tiers, and extracting one or more of the identified pictures from the video stream.

Example Embodiments

A description of the MPEG-2 Video Coding standard can be found in the following publication, which is hereby incorporated by reference: (1) ISO/IEC 13818-2, (2000), "Information Technology—Generic coding of moving pictures and associated audio—Video." A description of the AVC video coding standard can be found in the following publication, which is hereby entirely incorporated by reference: (2) ITU-T Rec. H.264 (2005), "Advanced video coding for generic audiovisual services." A description of MPEG-2 Systems for transporting AVC video streams in MPEG-2 Transport packets can be found in the following publications, which are hereby entirely incorporated by reference: (3) ISO/IEC 13818-1, (2000), "Information Technology—Generic coding of moving pictures and associated audio—Part 1: Systems," and (4) ITU-T Rec. H.222.0|ISO/IEC 13818-1:2000/AMD.3, (2004), "Transport of AVC video data over ITU-T Rec. H222.0|ISO/IEC 13818-1 streams."

It is noted that "bitmap related information" is used throughput this specification to refer to assertions and/or bitmaps or other information related or pertaining to picture interdependency tiers. Throughput this specification tiers should be understood to refer to picture interdependency tiers.

It is noted that "picture" is used throughout this specification to refer to an image portion or complete image from a sequence of pictures that constitutes video, or digital video, in one of a plurality of forms. Throughout this specification, video programs or other references to visual content should be understood to include television programs, movies, or any other signals that convey or define visual content such as, for example, those provided by a personal video camera. Such video programs, when transferred, may include compressed data streams corresponding to an ensemble of one or more sequence of pictures and other elements that include video, audio, and/or other data, multiplexed and packetized into a transport stream, such as, for example, MPEG-2 Transport.

A video stream may further refer to the compressed digital visual data corresponding to any video service or digital video application, including but not limited to, a video program, a video conferencing or video telephony session, any digital video application in which a video stream is transmitted or received through a communication channel in a network system, or any digital video application in which a video stream is stored in or retrieved from a storage device or memory device. The disclosed embodiments may be embodied in many different forms and should not be construed as limited to the embodiments set forth herein; rather, these embodiments are provided so that this disclosure will be thorough and complete, and will fully convey the scope of the disclosure to those having ordinary skill in the art. Although a digital home communication terminal (DHCT) is used as an example device throughout the specification, particular embodiments described herein extend to other types of receivers with capabilities to receive and process AVC streams. For instance, particular embodiments are applicable to hand-held receivers and/or mobile receivers that are coupled to a network system via a communication channel. Certain embodiments described herein also extend to network devices (e.g., encoders, switches, etc.) having receive and/or transmit functionality, among other functionality. Particular embodiments are also applicable to any video-services-enabled receiver (VSER) and further applicable to electronic devices such as media players with capabilities to process AVC streams, independent of whether these electronic devices are coupled to a network system. Furthermore, all embodiments, illustrations and examples given herein are intended to be non-limiting, and are provided as an example list among other examples contemplated but not shown.

FIG. 1 is a high-level block diagram depicting an example environment in which an embodiment of systems and methods that implement processing of compressed video and information identifying pictures in respective picture interdependency tiers. In particular, FIG. 1 is a block diagram that depicts an example subscriber television system (STS) 100. In this example, the STS 100 includes a headend 110 and a DHCT 200 that are coupled via a network 130. The DHCT 200 is typically situated at a user's residence or place of business and may be a stand-alone unit or integrated into another device such as, for example, a display device 140 or a personal computer (not shown), among other devices. The DHCT 200 receives signals (video, audio and/or other data) including, for example, digital video signals in a compressed representation of a digitized video signal such as, for example, AVC streams modulated on a carrier signal, and/or analog information modulated on a carrier signal, among others, from the headend 110 through the network 130, and provides reverse information to the headend 110 through the network 130.

The network 130 may include any suitable medium for communicating video and television service data including, for example, a cable television network or a satellite television network, among others. The headend 110 may include one or more server devices (not shown) for providing video, audio, and other types of media or data to client devices such as, for example, the DHCT 200.

The headend 110 also includes one or more encoders or compression engines 111 that, in one embodiment, provide or insert picture interdependency related information (e.g., bitmaps, flags, and/or other messaging pertaining to picture interdependencies and/or information that asserts the presence of information pertaining to one or more picture interdependency tiers as described further below) into the transport stream to enable or assist the DHCT 200 or other network devices in the decoding, parsing, and/or extracting of pictures of top tiers and/or discarding of pictures in bottom tiers, from a video stream, as explained further below. Although shown residing in a headend 110, the encoders may be located elsewhere within the network. For instance, insertion or the providing of assertions and bitmaps or other information related to picture interdependency tiers may be implemented upstream or external of the headend 110. The headend 110 and the DHCT 200 cooperate to provide a user with television services including, for example, broadcast video programs, an interactive program guide (IPG), and/or video-on-demand (VOD) presentations, among others. The television services are presented via the display device 140, which is typically a television set that, according to its type, is driven with an interlaced scan video signal or a progressive scan video signal. However, the display device 140 may also be any other device capable of displaying video images including, for example, a computer monitor. Although shown communicating with a display device 140, the DHCT 200 may communicate with other devices that receive, store, and/or process video streams from the DHCT 200, or that provide or transmit video streams or uncompressed video signals to the DHCT 200.

Figure 2:
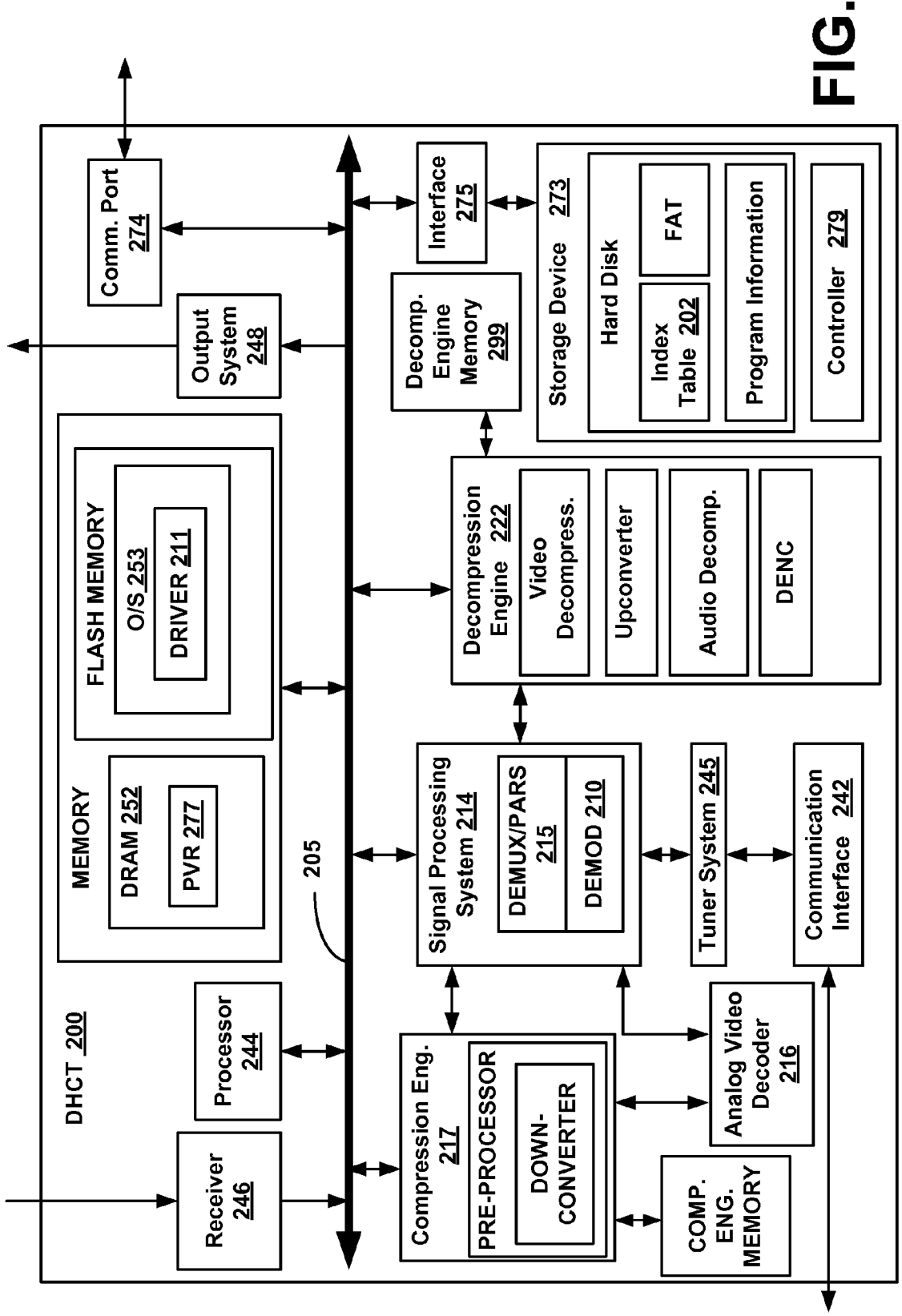
FIG. 2 is a block diagram of an embodiment of a digital home communication terminal (DHCT) as depicted in FIG. 1 and related equipment, in which an embodiment of systems and methods that implement at least in part processing of compressed video and information identifying pictures in respective picture interdependency tiers.

FIG. 2 is a block diagram of an embodiment of a DHCT 200 as depicted in FIG. 1 and related equipment, in which an embodiment of systems and methods that implement at least in part processing of compressed video and information identifying pictures in respective picture interdependency tiers. It will be understood that the DHCT 200 shown in FIG. 2 is merely illustrative and should not be construed as implying any limitations upon the scope of the disclosure. For example, in some embodiments, the DHCT 200 may have fewer, additional, and/or different components than the components illustrated in FIG. 2. Any of the described subsystems or methods of DHCT 200 and/or encoder 111 can comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

The DHCT 200 is generally situated at a user's residence or place of business and may be a stand-alone unit or integrated into another device such as, for example, a television set or a personal computer. The DHCT 200 preferably includes a communications interface 242 for receiving signals (video, audio and/or other data) from the headend 110 (FIG. 1) through the network 130 (FIG. 1), and provides reverse information to the headend 110.

The DHCT 200 may further include one or more processors (one processor 244 is shown) for controlling operations of the DHCT 200, an output system 248 for driving the television display 140 (FIG. 1), and a tuner system 245 for tuning to a particular television channel and/or frequency and for sending and receiving various types of data to/from the headend 110 (FIG. 1). The DHCT 200 may include, in some embodiments, multiple tuners for receiving downloaded (or transmitted) data. The tuner system 245 can select from a plurality of transmission signals provided by the subscriber television system 100 (FIG. 1). The tuner system 245 enables the DHCT 200 to tune to downstream media and data transmissions, thereby allowing a user to receive digital media content via the subscriber television system 100. In one embodiment, analog TV signals can be received via tuner system 245. The tuner system 245 includes, in one implementation, an out-of-band tuner for bi-directional data communication and one or more tuners (in-band) for receiving television signals. Additionally, a receiver 246 receives externally-generated user inputs or commands from an input device such as, for example, a remote control device (not shown).

The DHCT 200 may include one or more wireless or wired interfaces, also called communication ports or interfaces 274, for receiving and/or transmitting data or video streams to other devices. For instance, the DHCT 200 may feature USB (Universal Serial Bus), Ethernet, IEEE-1394, serial, and/or parallel ports, etc. The DHCT 200 may be connected to a home network or local network via communication interface 274. The DHCT 200 may also include an analog video input port for receiving analog video signals. User input may be provided via an input device such as, for example, a hand-held remote control device or a keyboard.

The DHCT 200 includes at least one storage device 273 for storing video streams received by the DHCT 200. A PVR application 277, in cooperation with operating system 253 and device driver 211, effects among other functions, read and/or write operations to/from the storage device 273. The processor 244 may provide and/or assist in control and program execution for operating system 253, device driver 211, applications (e.g., PVR 277), and data input and output. The processor 244 may further provide and/or assist in receiving and processing bitmap related information, identifying and extracting of pictures belonging respectively to one or more tiers, identifying and discarding of pictures belonging respectively to one or more tiers, and decoding and outputting a video stream after the extraction or discarding of identified pictures. The processor 244 may further assist or provide bitmap related information for a received compressed video stream or compressed video stream produced by DHCT 200. Herein, references to write and/or read operations to the storage device 273 can be understood to include operations to the medium or media of the storage device 273. The device driver 211 is generally a software module interfaced with and/or residing in the operating system 253. The device driver 211, under management of the operating system 253, communicates with the storage device controller 279 to provide the operating instructions for the storage device 273. As conventional device drivers and device controllers are well known to those of ordinary skill in the art, further discussion of the detailed working of each will not be described further here.

The storage device 273 may be located internal to the DHCT 200 and coupled to a common bus 205 through a communication interface 275. The communication interface 275 may include an integrated drive electronics (IDE), small computer system interface (SCSI), IEEE-1394 or universal serial bus (USB), among others. Alternatively or additionally, the storage device 273 may be externally connected to the DHCT 200 via a communication port 274. The communication port 274 may be according to the specification, for example, of IEEE-1394, USB, SCSI, or IDE. In one implementation, video streams are received in the DHCT 200 via communications interface 242 and stored in a temporary memory cache (not shown). The temporary memory cache may be a designated section of DRAM 252 or an independent memory attached directly, or as part of a component in the DHCT 200. The temporary cache is implemented and managed to enable media content transfers to the storage device 273. In some implementations, the fast access time and high data transfer rate characteristics of the storage device 273 enable media content to be read from the temporary cache and written to the storage device 273 in a sufficiently fast manner. Multiple simultaneous data transfer operations may be implemented so that while data is being transferred from the temporary cache to the storage device 273, additional data may be received and stored in the temporary cache.

The DHCT 200 includes a signal processing system 214, which comprises a demodulating system 210 and a transport demultiplexing and parsing system 215 (herein demultiplexing system) for processing broadcast and/or on-demand media content and/or data. One or more of the components of the signal processing system 214 can be implemented with software, a combination of software and hardware, or in hardware. The demodulating system 210 comprises functionality for demodulating analog or digital transmission signals.

An encoder or compression engine, as explained above, may reside at the headend 110 (e.g., embodied as encoder 111), in the DHCT 200 (e.g., embodied as compression engine 217), or elsewhere. The compression engine 217 can receive a digitized uncompressed video signal, such as, for example, one provided by analog video decoder 216, or a decompressed video signal produced by a decompression engine (e.g., decompression engine 222) as a result of decompressing a compressed video signal.

In one embodiment, digitized pictures and respective audio output by the analog video decoder 216 are presented at the input of the compression engine 217, which compresses the uncompressed sequence of digitized pictures according to the syntax and semantics of a video compression specification. Thus, the compression engine 217 implements a video compression method or algorithm that corresponds to a respective video compression specification, such as the AVC standard, to provide a video stream. The compression engine 217 may further provide bitmap related information for the provided video stream.

The systems and methods disclosed herein are applicable to any video compression method performed according to a video compression specification allowing for at least one type of compressed picture that can depend on the corresponding decompressed version of each of more than one reference picture for its decompression and reconstruction. For example, the compression engine 217 may compress the input video according to the specification of the AVC standard and produce an AVC stream containing different types of compressed pictures, some that may have a first compressed portion that depends on a first reference picture for their decompression and reconstruction, and a second compressed portion of the same picture that depends on a second and different reference picture.

In some embodiments, a compression engine with similar compression capabilities, such as one that can produce AVC streams, is connected to the DHCT 200 via communication port 274, for example, as part of a home network. In another embodiment, a compression engine with similar compression capabilities, such as one that can produce AVC streams, may be located at the headend 110 or elsewhere in the network 130. The compression engine in the various embodiments may include capabilities to provide bitmap related information for a produced video stream.

Unless otherwise specified, a compression engine as used herein may reside at the headend 110 (e.g., as encoder 111), in the DHCT 200 (e.g., as compression engine 217), connected to DHCT 200 via communication port 274, or elsewhere. Likewise, video processing devices as used herein may reside at the headend 110, in the DHCT 200, connected to the DHCT 200 via communication port 274, or elsewhere. In one embodiment, the compression engine and video processing device reside at the same location. In another embodiment, they reside at different locations. In yet another embodiment, the compression engine and video processing device are the same device.

The compressed video and audio streams are produced in accordance with the syntax and semantics of a designated audio and video coding method, such as, for example, MPEG-2 or AVC, so that the compressed video and audio streams can be interpreted by the decompression engine 222 for decompression and reconstruction at a future time. Each AVC stream is packetized into transport packets according to the syntax and semantics of transport specification, such as, for example, MPEG-2 transport defined in MPEG-2 systems. Each transport packet contains a header with a unique packet identification code, or PID, associated with the respective AVC stream.

The demultiplexing system 215 can include MPEG-2 transport demultiplexing capabilities. When tuned to carrier frequencies carrying a digital transmission signal, the demultiplexing system 215 enables the separation of packets of data, corresponding to the desired AVC stream, for further processing. Concurrently, the demultiplexing system 215 precludes further processing of packets in the multiplexed transport stream that are irrelevant or not desired, such as packets of data corresponding to other video streams. Parsing capabilities of the demultiplexing system 215 allow for the ingesting by the DHCT 200 of program associated information carried in the transport packets. Parsing capabilities of the demultiplexing system 215 may allow for ingesting by DHCT 200 of bitmap related information, such as, for example, assertions and bitmaps or other information related or pertaining to the identification of pictures in one or more picture interdependency tiers.

In one embodiment, bitmap related information can be provided by specifying explicit information in the private data section of the adaptation field or other fields of a transport stream packet, such as that of MPEG-2 transport. In one embodiment, the signaling and provision of such information is at the video program's multiplex level, or the transport layer (rather than in the video layer). The bitmap related information can be carried as unencrypted data via, for example, private data carried in the adaptation field of MPEG-2 Transport packets.

For instance, a transport packet structure according to MPEG-2 comprises 188 bytes, and includes a 4-byte header with a unique packet identifier, or PID, that identifies the transport packet's corresponding stream. An optional adaptation field may follow the transport packet's header. The payload containing a portion of the corresponding stream follows the adaptation field, if present in the transport packet. If the adaptation field is not present, the payload follows the transport header. The bitmap related information corresponding to the compressed pictures in the AVC stream are provided, in one embodiment, in the adaptation field and thus not considered as part of the video layer since the adaptation field is not part of transport packet's payload nor part of the AVC specification but rather part of the syntax and semantics of MPEG-2 Transport in accordance with the MPEG-2 systems standard.

The header of a transport stream may include a sync byte that sets the start of a transport stream packet and allows transmission synchronization. The header of the transport stream may further include a payload unit start indicator that, when set to a certain value (e.g., 1b in MPEG-2 Transport) in the packets carrying the video stream, indicates that the transport packet's payload begins with the first byte of a packet of a packetized elementary stream (PES). Video streams carried in a PES may be constrained to carrying one compressed picture per PES packet, and that a PES packet must always commence as the first byte of a transport streams' packet payload. Thus, the payload unit start indicator provisions the identification of the start of each successive picture of the video stream carried in the transport stream. Note that the transport packets carrying the video stream are identified by the parsing capabilities of DHCT 200 (as described above) from program associated information or program specific information (PSI). For instance, in MPEG-2 Transport, program map tables identify the packet identifier (PID) of the video stream in the program map table (PMT), which in turn is identified via the program association table (PAT).

It should be noted that the bitmap related information is provided in the transport layer unencrypted and enable a video decoder or other video processing device located in a network to determine for a particular application or operation which pictures to extract from the video stream and/or which pictures to discard from the video stream without having to parse the compressed video layer or video stream.

The bitmap related information identifies pictures in the video stream that belong respectively to one or more picture interdependency tiers. This in turn enables the annotation of the successive location of pictures corresponding to respective picture interdependency tiers, when the video program is stored in a hard-drive of the DHCT 200. The video program may be stored as a transport stream. In an alternate embodiment, it may be stored as a program stream. The annotated locations of pictures of the video program may be processed by processor 244 while executing the PVR application 277 to extract the pictures of the video program belonging to the top tier from a starting point, or to extract additional pictures belonging to each respective successive top tiers from the same starting point (i.e., ascending numbered tiers, as described below) to provide a trick mode operation.

One or more flags in a transport packet header or in the adaptation field may identify starting points or random access points that may serve as starting points for tracking bitmap related information. For instance, the adaptation field in MPEG-2 Transport packets includes the random access indicator and the elementary stream priority indicator.

The components of the signal processing system 214 are generally capable of QAM demodulation, forward error correction, demultiplexing of MPEG-2 transport streams, and parsing of packets and streams. Stream parsing may include parsing of packetized elementary streams or elementary streams. Packet parsing may include parsing and processing of fields that deliver bitmap related information corresponding to the AVC stream. In some embodiments, parsing performed by signal processing system 214 extracts bitmap related information and processor 244 provides processing and interpretation of the bitmap related information. In yet another embodiment, processor 244 performs parsing, processing, and interpretation of the bitmap related information. The signal processing system 214 further communicates with the processor 244 via interrupt and messaging capabilities of the DHCT 200. The processor 244 annotates the location of pictures within the video stream or transport stream as well as other pertinent information corresponding to the video stream. Alternatively or additionally, the annotations may be according to or derived from the bitmap related information corresponding to the video stream. The annotations by the processor 244 enable normal playback as well as other playback modes of the stored instance of the video program. Other playback modes, often referred to as "trick modes," may comprise backward or reverse playback, forward playback, or pause or still. The playback modes may comprise one or more playback speeds other than the normal playback speed. In some embodiments, the bitmap related information is provided to the decompression engine 222 by the processor 244. In another embodiment, the annotations stored in the storage device are provided to the decompression engine 222 by the processor 244 during playback of a trick mode. In yet another embodiment, the annotations are only provided during a trick mode, wherein the processor 244 has programmed the decompression engine 222 to perform trick modes.

Annotations may be simply bitmap related information. Processor 244 can extract pictures from top tiers and/or discard pictures from bottom tiers as further described below.

The packetized compressed streams can also be outputted by the signal processing system 214 and presented as input to the decompression engine 222 for audio and/or video decompression. The signal processing system 214 may include other components (not shown), including memory, decryptors, samplers, digitizers (e.g., analog-to-digital converters), and multiplexers, among others. The demultiplexing system 215 parses (e.g., reads and interprets) transport packets, and deposits the information corresponding to the bitmap(s) corresponding to the AVC stream into DRAM 252.

Upon effecting the demultiplexing and parsing of the transport stream, the processor 244 interprets the data output by the signal processing system 214 and generates ancillary data in the form of a table or data structure (index table 202) comprising the relative or absolute location of the beginning of certain pictures in the compressed video stream in accordance with the bitmap related information corresponding to the video stream. The processor 244 also processes the information corresponding to the bitmap related information to make annotations for PVR operations. The annotations are stored in the storage device by the processor 244. In one embodiment, the bitmap related information comprises of the annotations and it is stored in the hard drive. Such ancillary data is used to facilitate the retrieval of desired video data during future PVR operations.

The demultiplexing system 215 can parse the received transport stream (or the stream generated by the compression engine 217, which in some embodiments may be a program stream) without disturbing its video stream content and deposit the parsed transport stream (or generated program stream) into the DRAM 252. The processor 244 can generate the annotations even if the video program is encrypted because the bitmap related information of the AVC stream is carried unencrypted. The processor 244 causes the transport stream in DRAM 252 to be transferred to a storage device 273. Additional relevant security, authorization and/or encryption information may be stored. Alternatively or additionally, the bitmap related information corresponding to the AVC stream may in the form of a table or data structure comprising the interdependencies among the pictures, as explained further below.

Note that in one embodiment, reference herein to a decoding system comprises decoding functionality and cooperating elements, such as found in the collective functionality of the decompression engine 222, processor 244, signal processing system 214, and memory. In some embodiments, the decoding system can comprise fewer, greater, or different elements. Further, certain system and method embodiments include components from the headend (e.g., the encoder 111, etc.) and/or components from the DHCT 200, although fewer or greater amount of components may be found in some embodiments.

AVC streams, or other compressed video streams, comprise pictures that may be encoded according to a hierarchy of picture interdependencies, or tiers of picture dependencies. Pictures are associated with hierarchy of tiers based on picture interdependencies. Each compressed picture belongs to at most one tier. Tiers are numbered sequentially from top to bottom, starting with tier number 1 as the top tier. The bottom tier has the highest number. Pictures in a tier do not depend on pictures on any higher numbered tier. Thus, bitmap related information is to be provided consistent identification, such that any identified picture corresponding to a tier is not to depend on pictures belonging to any higher numbered tier. Another aspect of the hierarchy of tiers is that decoding of some pictures depends on particular other pictures. Therefore, if one picture serves as a reference picture to other pictures, it can be considered more important than other pictures. In fact, a particular set of pictures can be viewed in a hierarchy of importance, based on picture interdependencies.

One embodiment of a stream generator selects I and IDR-pictures for inclusion in the top tier. Another embodiment also includes forward predicted pictures in the top tier.

An anchor picture can be an I-picture, IDR-picture, or a FPP (forward predicted picture) that depends only on a past reference pictures. In some embodiments, an FPP is an anchor picture if it only depends on the most-recently decoded anchor picture.

Pictures can be categorized as belonging a particular picture interdependency tier or "level", and some embodiments of a stream generator may include bitmap related information for tiers above a certain tier of the hierarchy (e.g., the two top tiers). In another embodiment, bitmap related information may be provided only for tiers below a particular tier of the hierarchy (e.g., the two bottom tiers). In yet another embodiment, bitmap related information may be provided only for tiers below a particular tier of the hierarchy, for tiers above a certain tier of the hierarchy, or for a combination of both top tiers and bottom tiers. Bitmap related information is to always be provided starting from the top tier, and/or starting from the bottom tier (highest number). A picture's corresponding tier may be understood as a measure of its importance in decoding other pictures—some reference pictures are more important than other reference pictures because their decoded and reconstructed information propagates through more than one level of referencing.

A person of ordinary skill in the art should also recognize that although AVC picture types are used in this disclosure, the systems and methods disclosed herein are applicable to any digital video stream that compresses one picture with reference to another picture or pictures.

Figure 3:
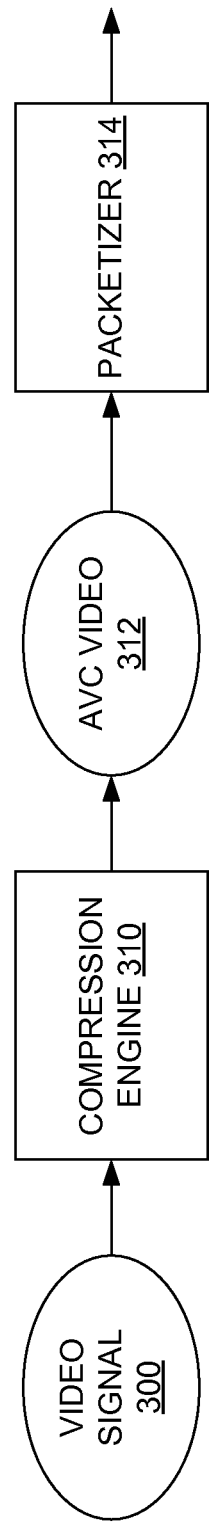
FIG. 3 is a block diagram that illustrates an example transport stream generation.

FIG. 3 is a block diagram that illustrates selected components in the generation of the portion of a transport stream containing a video stream, such as an AVC stream, and corresponding bitmap related information. In some embodiments, the generation of the transport stream may occur at the headend 110, or upstream (or downstream) of the headend 110. In some embodiments, bitmap related information for a video stream may be generated at the DHCT 200, both provided in a transport stream. In an alternate embodiment, both are provided in a program stream. In still some embodiments, transport streams may be generated at the headend 110 and the DHCT 200. The compression engine 310 (which may refer, in some embodiments, to the encoder 111 of FIG. 1, or in some embodiments, the compression engine 217 of FIG. 2, among others) receives as input a video signal 300, such as a digitized uncompressed video signal or a decompressed video signal. The compression engine 310 outputs a compressed video stream 312, such as an AVC video stream, and/or other data (e.g., bitmap related information), wherein such compressed pictures are provided in the video stream in transmission order. Packetizer 314 packetizes the AVC video stream 312 to output a stream of packets.

An AVC stream is used as an example throughout this specification. However, particular embodiments are also applicable to any compressed video stream compressed according to a video compression specification allowing for: (1) any picture to be compressed by referencing more than one other picture, and/or (2) any compressed picture that does not deterministically convey or imply its actual picture-interdependency characteristics from its corresponding picture-type information in the video stream. Herein, reference is made to the "picture-type" corresponding to an AVC compressed picture as the information conveyed by one or possibly more respective fields in the AVC stream with semantics conveying a "type of picture" or a type of "slice." That is, in accordance with the AVC standard, the picture-type may be conveyed in an AVC stream by different methods. For instance, the picture-type may be expressed by the "primary_pic_type" field in the "access unit delimiter." Alternatively, the picture-type may be expressed collectively by one or more "slice_type" fields corresponding respectively to each of one or more respective slices of the AVC compressed picture. The "slice_header" of each slice of an AVC compressed picture includes its "slice_type" field. An AVC compressed picture may have only one slice. Although picture type information is described as being transferred in specific fields or parts of standard formats, other placements or methods to convey such information are possible. The bitmap related information can be included in the network adaptation layer (as described in the AVC specification) or in any other layer, structure, stream, unit, position or location.

There are two main methods of compressing pictures in AVC, Intra and Inter (or Non-Intra) compression. Intra compression is done without reference to other pictures but typically exhibits less compression efficiency than Inter compression. Inter compression exploits temporal redundancy and irrelevancy by referencing one or more other pictures. A reference picture is depended on by at least one other picture for its compression. The decompressed version of the reference picture is used during AVC compression performed by a compression engine to predict at least one portion of a picture that depends on the reference picture. During decompression of an AVC stream performed by a decompression engine, such as decompression engine 222 in DHCT 200, a reference picture is also depended on to decompress and reconstruct at least a portion of at least one other picture. A picture that is not a reference picture (e.g., that is not depended on by at least one other picture) is a non-reference picture.

It should be understood that throughout this specification, the term "depend" or "dependence" in context to reference pictures refers to a "direct" dependence. These terms do not refer to an indirect dependence, such as the propagation of second picture's data through referencing a first picture that in turn referenced the second picture.

The output time of a picture, or picture-output time, refers to its display time, which is at the time of, or after, it has been completely decompressed and reconstructed. For instance, the output time of a picture corresponds to the time that output system 248 in DHCT 200 provides the decompressed version of an AVC picture to display device 140. To output a picture generally refers to an output of its intended decompressed version. It is noted that a picture that is decompressed and output prior to decompressing all of its depended reference pictures would likely result in incomplete visual information, and, thus, such output picture does not represent its intended decompressed version. A decode-time-stamp (DTS) and a presentation-time-stamp (PTS) is typically associated with a picture in an AVC stream in accordance with the specification for transporting AVC streams in the amended MPEG-2 systems standard. The PTS of a picture, whether provided in the transport stream or derived by decompression engine 222 in DHCT 200, corresponds to its hypothetical output time during fulfillment of a normal playback mode of the AVC stream. The DTS of a picture corresponds to its decompression time and can also be provided in the transport stream or derived by decompression engine 222 in DHCT 200. Successive compressed pictures in an AVC stream are decompressed in their transmission order (i.e., also the received order) by decompression engine 222 in DHCT 200, and thus have successive decompression times. Although certain embodiments of the disclosure presented herein primarily take into account and realize advantages in decoding extracted pictures and/or processing discarded pictures according to bitmap related information, embodiments can also focus on analysis and optimization of presentation order. In general, the bitmap related information can be used by any software process, hardware device (or combination thereof) at any point in a creation, encoding, distribution, processing/decoding and display chain in order to realize a benefit.

The transmission order of pictures is established in accordance with several ordering rules, each with a respective priority. The highest-priority ordering rule enforces each reference picture to be transmitted in the AVC stream prior to all the pictures that reference it. A second ordering rule with high priority enforces pictures that would otherwise have the same ordering priority, to be transmitted in order of their respective output time, from the earliest to the latest.

Video coding standards typically assume a hypothetical instantaneous decoder, meaning that a compressed picture can be instantaneously decompressed at its DTS. A picture's PTS may equal its DTS, thus the hypothetical instantaneous decoder assumes in such cases that the picture is decompressed and output instantaneously.

A picture-output interval is defined according to the picture rate, or frame rate, of the AVC stream. For instance, if the AVC stream corresponds to a video signal at 60 pictures-per-second, the picture-output interval is approximately equal to 16.66 milliseconds. Each consecutive picture-output interval begins at a picture-output time, and a picture is output throughout the picture-output interval. In one embodiment, the actual output time of each picture output by decompression engine 222 is delayed from its hypothetical output time, or PTS, by one picture-output interval. That is, the actual output time of every picture equals the PTS of the picture plus one picture-output interval. A past reference picture is a previously-decompressed reference picture that has an output time prior to the picture referencing it. Likewise, a future reference picture is a previously decompressed reference picture that has an output time after the picture referencing it.

An AVC Intra picture, or I-picture, does not reference other pictures but is typically referenced by other pictures. Unlike MPEG-2 Video, Intra compression in AVC allows for prediction of the region of the picture being compressed from the decompressed version of other portions of the same picture. An AVC "instantaneous decoding refresh" picture, or IDR-picture, is an I-picture that forces all previously decompressed pictures that are being used as reference pictures to no longer be used as reference pictures upon decompression of the IDR picture. P-pictures and B-pictures in AVC are allowed to contain intra-compressed portions. As in MPEG-2 Video, P-pictures and B-pictures in AVC allow for any, and possibly all, of a picture's portions to be inter-predicted from "previously-decompressed" reference pictures. Also similar to MPEG-2 Video, inter-prediction of any portion of a P-picture in AVC is limited to using at most one reference picture at a time. However, in contrast to MPEG-2 Video, each different inter-predicted portion of an AVC P-picture is allowed to be predicted from any one of several distinct reference pictures. Similar to MPEG-2 Video, inter-prediction of any portion of a B-picture in AVC is limited to using at most two reference pictures. But whereas MPEG-2 Video uses at most two reference pictures for all of the B-picture, any of several distinct reference pictures is allowed to be used on each different inter-predicted portion of an AVC B-picture.

The number of total reference pictures depended on by different AVC P-pictures may be respectively different. Similarly, the number of total reference pictures depended on by different AVC B-pictures may be respectively different. In accordance with the AVC standard, the "maximum number" of allowed reference pictures in an AVC stream varies depending on the specified "Level" for an AVC stream and the spatial resolution of the compressed pictures in that AVC stream. Furthermore, AVC reference pictures have no predetermined location in relation to the picture referencing them. These flexibilities in the AVC standard result in better compression efficiency. However, they hinder stream manipulation capabilities of video processing devices since no inferences are implied about the picture-interdependency characteristics of a compressed picture in an AVC stream that has a picture-type of a P-picture or a B-picture.

Thus, the AVC standard specifies a P-picture by allowing each different inter-predicted portion of the picture to be predicted from "at most one" of any of a plurality of different reference pictures, as for example, 16 reference pictures. Unlike the MPEG-2 video standard or other video compression specifications that further limit inter-prediction to referencing one "predetermined" past reference picture, in AVC there is no such limitation. For instance, a first portion of an AVC P-picture can depend on one reference picture and another portion on a different reference picture. In fact, a picture referenced by a first portion of an AVC P-picture may be a past reference picture, and a second portion may depend on a future reference picture. As another example of the elaborate and complex picture-interdependencies allowed in AVC, a first AVC P-picture may depend on four future reference pictures, a second AVC P-picture may depend on three past reference pictures, and a third AVC P-picture may depend on both, a plurality of past reference pictures and a plurality of future reference pictures.

The AVC standard also specifies the B-picture differently than does the MPEG-2 video standard. MPEG-2 video specifies a B picture as a bi-directional picture, allowing for any portion of the picture to be compressed with a dependence of not more than two reference pictures, one a "predetermined" future reference picture, and the other a "predetermined" past reference picture. The same two reference pictures, or either of them, must be used as the reference pictures for predicting any portion of the B-picture. On the other hand, an AVC B-picture can depend on a plurality of reference pictures, for instance, up to 16 reference pictures, as long as any region of the B-picture is predicted by at most two regions in the plurality of reference pictures. When a region of the B-picture is predicted by two regions, it is said to be bi-predicted rather than bi-directionally predicted. In further contrast to MPEG-2 Video, an AVC B-picture is allowed to be used as a reference picture by other P-pictures or B-pictures.

As an example of the elaborate and complex picture-interdependencies allowed in AVC B-pictures, a first region of an AVC B-picture is allowed to be bi-predicted from two past reference pictures, a second region bi-predicted from two future reference pictures, a third region bi-predicted from a past reference picture and a future reference picture, and these three regions depend on six different reference pictures. The set of reference pictures used by a first B-picture in the AVC stream may be different than the set of reference pictures used by a second B-picture, even if they are both in consecutive transmission order or have consecutive output times. As described previously, AVC reference pictures have no predetermined location in relation to the picture referencing them. It should be apparent that many types and combinations of picture (or picture portion) dependencies are possible and that different types of auxiliary information can be created to describe the interdependencies or relationships among the pictures that provide benefits to later processing of the picture information.

Added complexities include the fact that an I-picture that does not serve as a reference picture is a non-reference picture. Furthermore, some I-pictures may be more important than other I-pictures, depending on the relative location of the I-picture in the AVC-stream and/or on how many other AVC compressed pictures reference the I-picture.

It should be appreciated that while some video compression specifications have picture-types that respectively imply specific picture inter-dependency characteristics, the picture-type of a compressed picture in an AVC stream cannot be relied on for implying an AVC compressed picture that exhibits some characteristics. Besides, even if the picture-type would be able to convey useful information, there are other aspects that make it difficult to easily peek and identify pictures with a certain characteristic (characteristic including interdependency) in an AVC stream, such as, when the payload of transport packets carrying the AVC stream is encrypted or scrambled. Finding the slice_type and other desired data fields in the transport packet's payload to verify a certain characteristic of the picture may be difficult and require significant traversing into the AVC stream, especially if a desired data field's alignment relative to the start of a transport packet's payload or relative to some other identifiable delimiter varies.

Throughout this specification, a sequence of consecutive pictures in the AVC stream, or consecutive pictures in the AVC stream, refers to of the consecutive compressed pictures in their transmission order, or equivalently, a sequence of compressed pictures in the AVC stream having successive decode-time-stamps.

A discardable picture is a non-reference picture. A discardable picture with a delayed output time is a discardable picture having a PTS that is later than its DTS. That is, it is a discardable picture that is not output immediately after it is decompressed, and although it is not referenced by any other picture, it enters a "decoded picture buffer" (DPB) specified in the AVC standard for at least one picture-output interval. The DPB resides in decompression memory 299 of DHCT 200, although not limited to residing in that particular location.

Figure 4A:
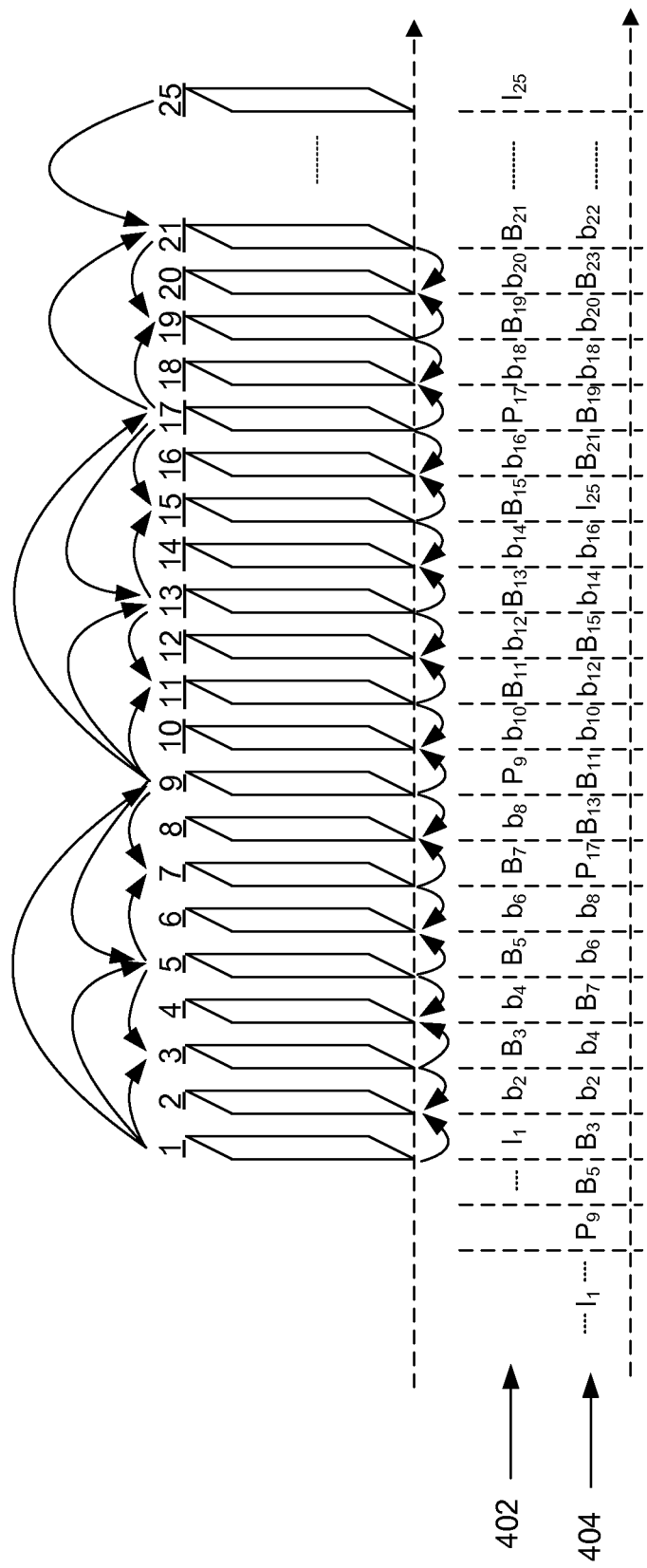
FIGS. 4A and 4B are block diagrams that illustrates picture interdependencies in an example sequence of compressed pictures provided by the transport stream generator.
Figure 4B:
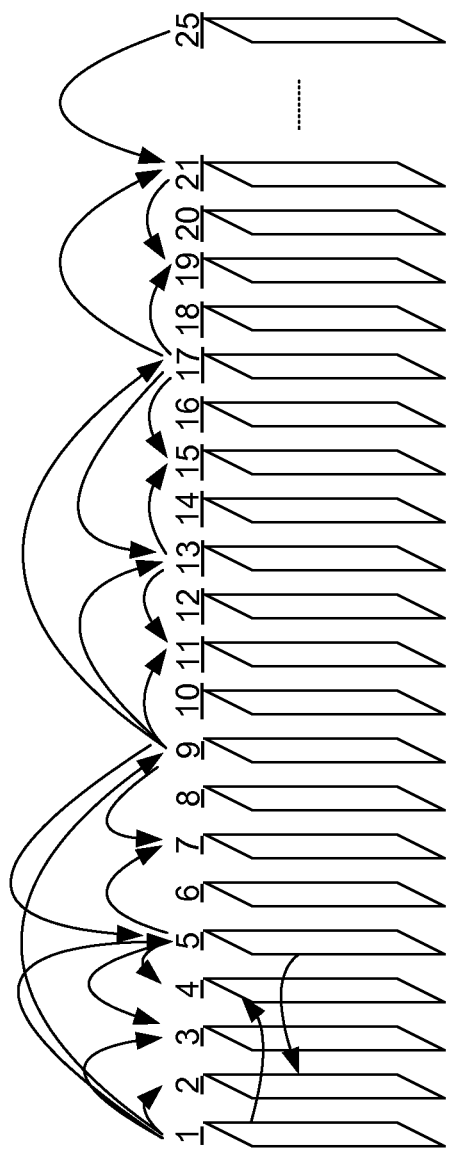

Attention is now directed to FIGS. 4A and 4B, which are block diagrams that illustrate picture interdependencies in an example sequence of compressed pictures provided by a transport stream generator. The first row 402 of FIG. 4A comprises the output order of an exemplary GOP, such as received and decoded in decode order 404 (i.e., transmission order) at the decompression engine 222. The GOP comprises a sequence of compressed pictures (designated by picture types, such as I, P, or B). The picture interdependencies are shown, in part, by the arrows above and below each picture (pictures numbered 1-25 at the top of each respective picture). An arrow tail shown at a picture depicts that that picture serves as a reference picture to the other picture where the corresponding arrow head is shown. That is, the arrow conveys that the other picture is predicted from the reference picture. For instance, in FIG. 4A, picture 3 is predicted from (and hence depends from) picture 1 and picture 5. Although shown described having a similar pattern of dependency between bounds (e.g., between pictures 1 and 9, and pictures 9 and 17), one having ordinary skill in the art should appreciate that different patterns and/or dependencies can be found from one bounded group to the next, as shown in FIG. 4B (e.g., see picture interdependencies revealed between pictures 1 and 4 and pictures 5 and 2 within the pattern bounded by pictures 1 and 9, and how their interdependencies are different from the picture interdependencies shown in the pattern bounded by pictures 9 and 17).

Beneath row 402 of FIG. 4A is the decode order 404, corresponding to the order in which the pictures are decoded for reconstruction at the decompression engine 222. The transmission order of pictures is different than the output or display order due to the need to have the reference pictures prior to decoding a picture. Note that P pictures can be forward predicted or backwards predicted, and typically, that fact is not evident until the pictures are decoded. For instance, knowledge of the picture type (e.g., as ascertained by a header) does not necessarily convey how prediction is employed or picture interdependencies.

In MPEG-2, discardable pictures can be output immediately (no need to retain), though typically, for implementation reasons such pictures are temporarily stored for at least a picture period or interval. In AVC streams, even with discardable pictures, there are circumstances where the output of the discardable, decoded picture is delayed and hence retained in the decoded picture buffer (DPB). In one embodiment, a picture is retained in the DPB if it has not been output or if it is required for referencing by another picture that has not been decompressed.

Figure 5:
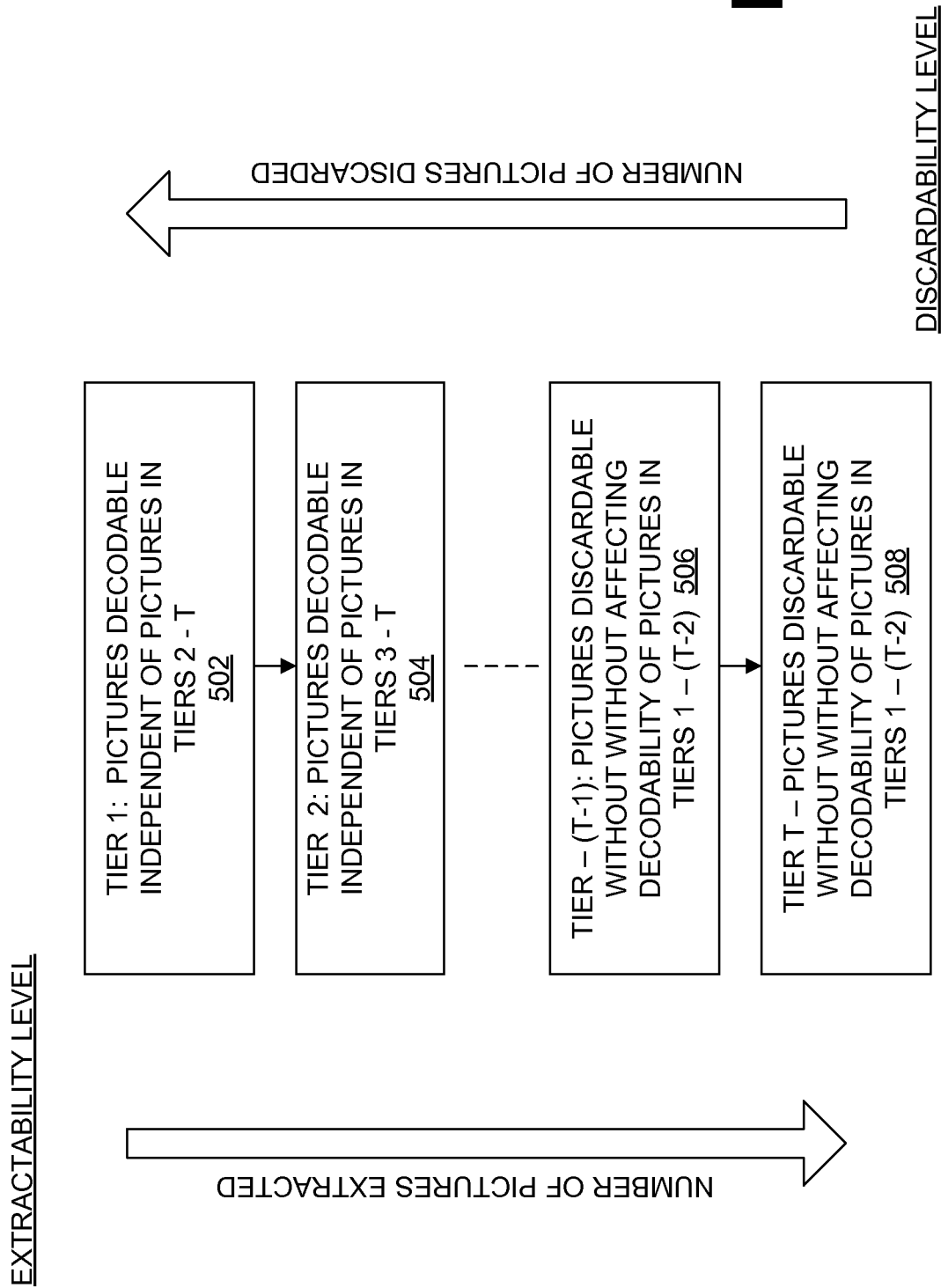
FIG. 5 is a block diagram that illustrates a hierarchy of picture interdependency tiers.
Figure 6:
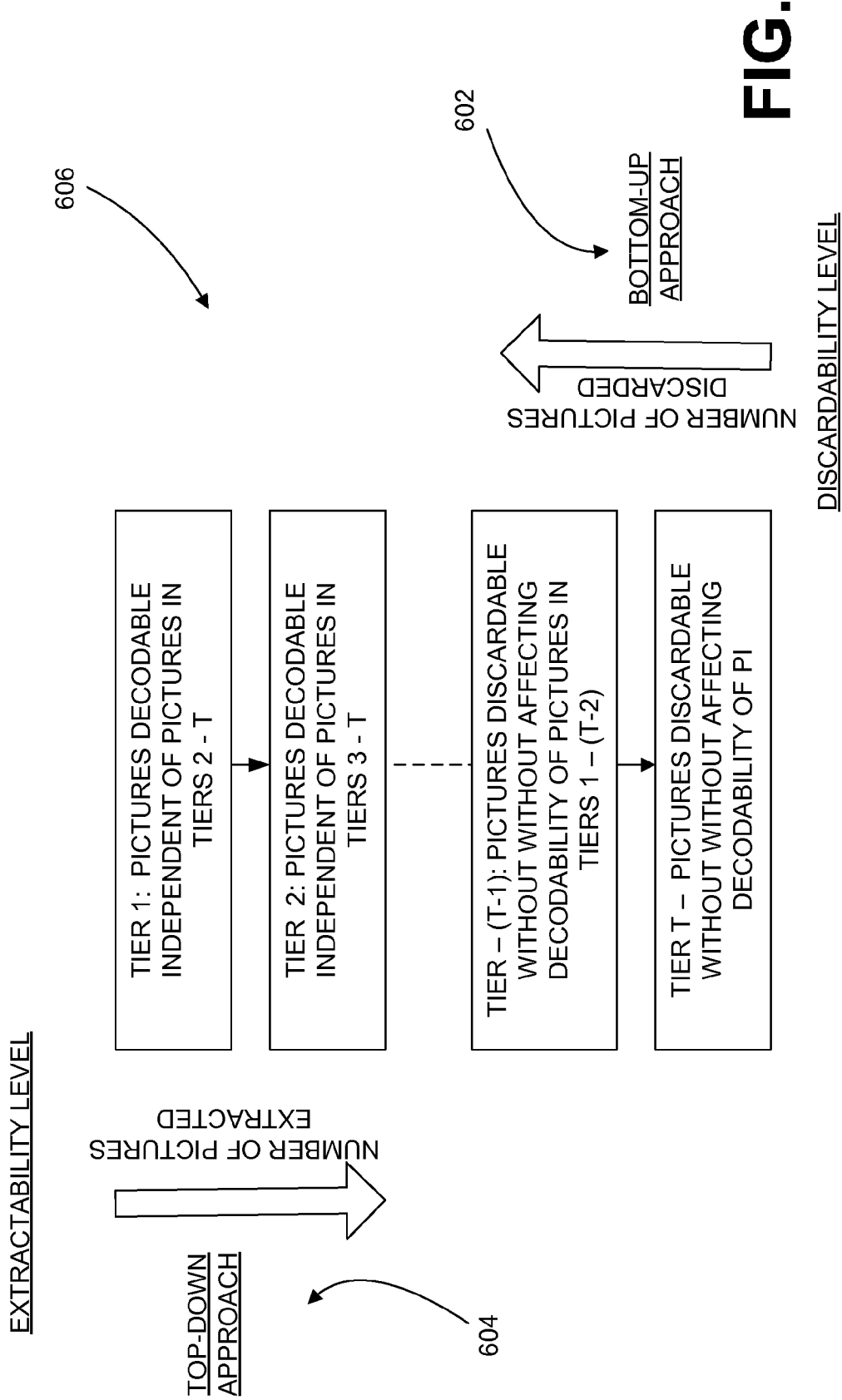
FIG. 6 is a block diagram of various approaches to providing information pertaining to picture interdependency tiers.

Attention is now directed to an explanation of tiers as shown in FIGS. 5 and 6. FIG. 5 illustrates an example of the hierarchy of picture interdependency tiers. A hierarchy of picture interdependency tiers has "T" tiers, T being the bottom tier. A picture in a video stream can only belong to one of the T tiers. However, a stream generator may opt to not identify the pictures belonging to some middle tiers in its provided bitmap related information. The top tier, or Tier 1 502, comprises of pictures in the video stream that can be decoded independently from pictures in Tiers 2 through T. The top tier is the first level of picture extraction. Each successive tier can be decoded independently from pictures in the video stream belonging to higher numbered tiers. For instance, the second tier from the top of the hierarchy, Tier 2 504, can be decoded of pictures independently of pictures belonging to tiers 3 through T. The top tier, or Tier 1 502, represents the first level of picture extractability. Picture extractability, the number of pictures that can be extracted from the video stream, increases from top to bottom, whereas picture discardability, the number of pictures that can be discarded from the video stream, increases from bottom to top. Conversely, picture discardability decreases from top to bottom and picture extractability decreases from bottom to top. Tier 1 502 comprises the first level of picture extractability and the last level of picture discardability. The T-th tier 508 (bottom tier) comprises of the first level of picture discardability and the last level of picture extractability. Tier—(T−1) 506 comprises the $2^{nd}$ level of picture discardability and the next to last level of picture extractability, etc.

In summary, Tier 1 502 pictures comprise those pictures that are decodable independent of pictures in Tier 2 504 through Tier T 508. Tier 2 504 pictures are pictures that are decodable independent of pictures in Tiers 3 through T 508, and so on.

Pictures in the bottom tier, Tier T 508, can be discarded without affecting the decodability of pictures remaining in the video streams that correspond to lower numbered tiers. Tier T 508 pictures are those that are discardable without affecting the decodability of pictures in Tiers 1 502 through (T−1) 506. Tier—(T−1) pictures are those that are discardable without affecting the decodability of the pictures remaining in the video in Tiers 1 502 through T−2 (not shown).

The first tier, or Tier 1 502, comprises of coded pictures (i.e., compressed pictures) in the video stream that when extracted progressively from a starting point in the video stream, such as a random access point, can be decoded and output independently of other coded pictures in the video stream. The second tier, or Tier 2 504, comprises of coded pictures in the video stream that when extracted progressively from the same starting point in the video stream, in concert with the progressive extraction with pictures belonging to Tier 1 502, adds another level of picture extraction. Thus, Tier 1 502 and Tier 2 504 can be decoded and output independently of other coded pictures in the video stream that are "determined not to belong to" or "not identified" as Tier 1 502 or Tier 2 504 coded pictures. More generally, for any value of K from 1 to T, coded pictures identified as or determined to belong to a tier from Tier 1 to Tier K can be independently decoded and output by extracting progressively all coded pictures in the video stream from a starting point if they are classified as or determined to belong to one of the tiers among Tiers 1 through K. Pictures belonging to Tiers 1 through K are identified or determined to belong to Tiers 1 through K from received or provided bitmap related information at DHCT 200. Thus, if in a progressive manner "all" the pictures belonging to Tiers 1 through K are: (1) extracted from the video stream from a starting point, and (2) decoded, then the next picture in the video stream that is classified or belongs to one of tiers in Tier 1 through Tier K can be extracted and decoded because all of the pictures that it depends on for temporal prediction and/or for motion compensation or pictures that it references as reference pictures will have been: (1) extracted from the video stream, (2) decoded and (3) available to be referenced.

It is noted that throughout this specification reference to a picture belonging to a tier or a picture in a tier is to be understood as a picture associated with a tier or a picture corresponding to a tier. A picture is associated or corresponds to at most one tier. Bitmap related information identifies the single tier associated or corresponding of one or more respective pictures in the video stream. Bitmap related information may not identify the associated or corresponding tier for one or more pictures in the stream.

A Tier-K coded picture in the video stream can be extracted and guaranteed to be decoded into its intended complete and full reconstruction if extraction and decoding of all immediately-preceding Tier-K coded pictures has been performed progressively for a finite amount of time prior to the extraction of that particular Tier-K coded picture. This is because video coding may perform temporal references across GOP boundaries. In one embodiment, a Tier-K coded picture can be extracted and decoded in its intended complete and full reconstruction if all coded pictures belonging to tiers Tier 1 through Tier K have been extracted and decoded progressively since or for at least the last "n" Random Access Points (RAPs) in the video stream immediately prior to the particular Tier-K coded picture. For instance, if a playback mode or trick mode, such as a fast forward, is to commence from a particular or desired location of the video stream, if may be necessary to start decoding at the second RAP (i.e., n=2) prior to the particular location of the video stream. RAPs can be signaled and identified with one or more specific flags in the MPEG-2 Transport level or layer's header and/or the adaptation field header. For instance, specifications such as MPEG-2 Systems provisions indicators in the transport stream, such as a random access point indicator and/or an elementary stream priority indicator, that serve to signal a RAP. In one embodiment, the RAP refers to an access unit (or picture) in the AVC bitstream at which a receiver can start the decoding of the video stream. The access unit also includes a sequence parameter set (SPS) and a picture parameter set (PPS) used for decoding the associated picture, and any other necessary parameters or set of parameters required to decode and output the pictures of the video stream. The random access points may carry an I picture or an IDR picture. In one embodiment, the GOP, typically an MPEG-2 term, is equivalent to the picture sequences and picture interdependencies found between two or more RAPs.

In an alternate embodiment, a Tier-K coded picture can be extracted and decoded in its intended complete and full reconstruction if all coded pictures belonging to tiers Tier 1 through Tier K have been extracted and decoded progressively since or for at least the last "n" beginnings of Group of Pictures (GOPs) in the video stream immediately prior to the particular Tier-K coded picture.

In yet another embodiment, a Tier-K coded picture can be extracted and decoded in its intended complete and full reconstruction if all coded pictures belonging to tiers Tier 1 through Tier K have been extracted and decoded progressively after at least the decoding of the last "n" I pictures or IDR pictures in the video stream prior to the location of the particular Tier-K coded picture in the video stream. In one embodiment "n" may have a first value for consecutive I pictures and a second value for consecutive IDR pictures.

In yet another embodiment, a Tier-K coded picture can be extracted and decoded in its intended complete and full reconstruction if at least G consecutive coded pictures belonging to tiers among Tier 1 through Tier K that precede the location of the particular coded picture in the video stream, have been extracted and decoded progressively.

Applying tiers to an example implementation, such as PVR, in an MPEG-2 video stream encoded with a common GOP where the pictures in output order are as follows: I B B P B B P B B P B B P and so on, the top tier, Tier 1 502, may be sufficient. For example, I pictures may be exclusively utilized in fast forward or rewind operations. But suppose that a finer level of granularity is desired for trick modes, or for improved accuracy in placement or removal of a picture in the trick mode operations. A second and/or third tier may be added to allow for this improved functionality while handling the complexities of AVC. Note that depending on the desired trick mode functionality (e.g., speed, direction, etc.), one embodiment may decode pictures in the top tier (e.g., 15× trick modes). In some embodiments, decoding may be implemented with pictures from the two top tiers.

The bitmap related information and/or the identification of tiers can be implemented according to a variety of approaches, as illustrated in FIG. 6. In some embodiments, a bottom-up approach 602 can be implemented (e.g., via a decompression engine), wherein pictures are identified from the highest numbered tier (i.e., first discardability level pictures) and then proceeding to pictures in one or more of the successive descending numbered tiers of the tier hierarchy. In some embodiments, a top-down approach 604 may be implemented, where pictures are identified from the first extractability level and then to pictures in successive ascending numbered tiers of the tier hierarchy. In some embodiments, a hybrid approach 606 may be implemented, based on a combination of the bottom-up approach 602 and top-down approach 604.

Having provided a background on hierarchical tiers and the properties of the pictures belonging to the respective tiers, attention is now directed to a system and method that explicitly identifies pictures in a given tier through the provision of bitmap related information, which may include one or more bitmaps. Bitmaps are asserted and asserted bitmaps provided, where the bits (or fields) of each of the bitmaps are ordered successively to correspond to the order of successive pictures of the video stream in transmission order. Decoding of extractable or extracted pictures is feasible from a given starting point, such as a random access point as described above. Other purposes of bitmap related information include to enable dropping of pictures (e.g., network flow management, etc.), scalability, among others. The bitmaps are not provided at every picture, but in one embodiment, at every random access point (RAP) and sometimes at other locations in the video stream, as explained further below. If a bitmap is provided for pictures belonging to the top tier, and the bits of the bitmap are ordered to correspond to the pictures in transmission order, pictures can be extracted sequentially from a RAP and decoded with the guarantee that all picture are capable of being decoded and reconstructed to their respective intended decompressed versions.

In one embodiment, the existence of bitmap related information pertaining to tiers and bitmaps is signaled in the transport stream, and a data field of flags is provided to indicate or assert the presence of a bitmap or bitmaps corresponding to one or more tiers, respectively. The processing of the bitmaps may be implemented using a "top-down" approach, extracting pictures from "top-tiers" (e.g., tier 1, FIG. 5), or "bottom-up" approach or "bottom-tier" pictures (e.g., tier T, FIG. 5)

are discarded. For instance, a data field of flags may indicate or assert the presence of respective bitmaps that correspond to one or more tiers. Each respective bitmap identifies the pictures belonging to a corresponding tier. Pictures can be identified from bitmaps corresponding to the top tier or to successive top tiers, extracted and decoded. Alternatively, pictures can be identified from the bitmaps corresponding to the bottom tier or to successive bottom tiers, discarded, and the remaining pictures in the video stream decoded. A first value of a single bit (e.g., "1") of the ordered bits of a bitmap asserts a single picture as belonging to the tier corresponding to that bitmap. A first flag value for a flag in the assertion flags field asserts the presence of the corresponding bitmap. For instance, the first flag value may be provided for the flag or sub-field of the assertion flags field corresponding to the bottom tier to assert the presence of a single bitmap corresponding to the bottom tier. Pictures pertaining to the bottom tier are discardable, and when discarded, result in decodable pictures in the video stream that are fully reconstructable to their intended decompressed version without reliance on the discarded pictures. In one embodiment, the bitmap related information, the assertion flags field and the bitmaps asserted as present by respective assertion flags, are provided in the location of a transport stream corresponding to a RAP and the picture associated with the RAP. Note that the bitmap related information is not provided every picture, but it is provided at least at every RAP (e.g., to accommodate channel changes, for instance) and/or at other locations in the video stream where permissible as described herein.

In one embodiment, bitmap related information is also provided at prespecified increment of pictures in the video stream, such as every $16^{th}$ picture, $32^{nd}$ picture, etc.

The existence of the assertion flags field and/or bitmaps (i.e., bitmap related information) is signaled in the transport stream. In other words, a specific message carries bitmap related information. It may also be possible for an "announcement" to be provided for alerting that the existence of a specific message carrying bitmap related information is present in the transport stream. For instance, the specific message carrying the bitmap related information can be announced with a corresponding specific announcement through the ES information loop of the PMT. Such an announcement serves to simply identify that the transport stream contains the specific message that carries bitmap related information. In one embodiment, the format of the specific message can be via an assigned message identification (e.g., a descriptor tag) and corresponding message length (e.g., a tag length). For instance, a descriptor tag may convey to a decoder that information of a particular type (e.g., corresponding to one of a plurality of tag values) is present in the transport stream. In one example, assume one byte for flag assertions and three asserted tiers as being present in the message, the asserted tiers corresponding to three respective bitmaps of 16 bits (2 bytes) each. Hence 6 bytes correspond to the bitmaps (3 bitmaps×2 bytes each) plus one byte corresponding to the assertion flags comprises a total of 7 bytes as the indicated length of the payload of the message. The payload of the message follows the first field for the descriptor tag and the second field for the length.

Figure 7:
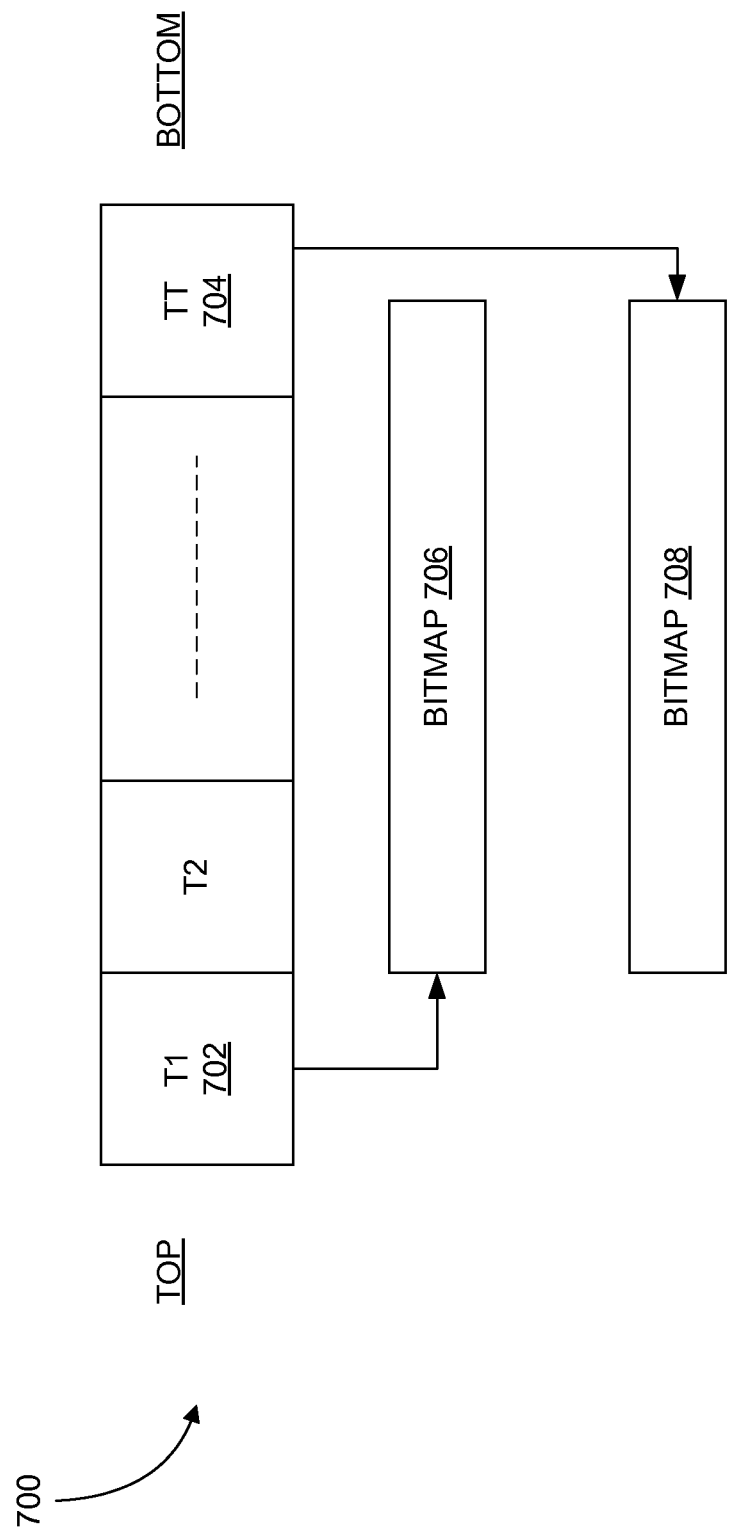
FIG. 7 is a block diagram that illustrates an embodiment of a data structure of plural fields used for asserting respectively the presence of information pertaining to one or more picture-interdependency tiers.

FIG. 7 shows an example for the assertion flags field as a data structure 700 of plural flags or sub-fields revealing five assertion flags (e.g., each of 1-bit) corresponding respectively to five tiers (from top tier, T1, to bottom tier, TT or T5). Data structure 700 may be a sub-field of another field comprising a complete byte. It should be understood that fewer or more tiers may be utilized in some implementations, and also, that tier priority nomenclature may be reversed (e.g., T1 may be the bottom tier and T5 the top tier). As explained above, identification of pictures may be according to one or more approaches, including top-down, bottom-up, or a hybrid approaches. In this example, top tier assertion flag 702 and bottom tier flag 704 are each set, and hence corresponding bit maps 706 and 708 are provided when a first flag value is present in the corresponding assertion bit of the data structure.

In one embodiment, the bitmaps 706 and 708 are of fixed length (e.g., in bytes or bits, such as 16 bits, or multiples of 8, as one example), and each bitmap relates to the immediately prior pictures of the video stream in transmission order, inclusive of the picture located or associated with location in the video stream where the bitmap related information is provided. In some embodiments, the bitmaps correspond to the immediately following pictures of the video stream in transmission order, inclusive of the picture located or associated with location in the video stream where the bitmap related information is provided. In one embodiment, the length of bitmaps can be predetermined, for instance at every $16^{th}$ picture or other defined periods. That is, a length field need not be given, as the bitmap lengths are predetermined (and each have the same predetermined length). For example, if a bit is asserted for a given tier, the length of the corresponding bitmap is the predetermined length. Though described as a predetermined length of every 16 pictures above, other predetermined lengths may be used, such as every 8 pictures, 24, 32, among other quantities. In some embodiments, the length of the bitmap can be explicitly provided via a length field (e.g., following the data structure 700), or as designated sub-field for bitmap length of data structure 700, and provided as a fixed value in one embodiment, or the length can be varied in other embodiments. For instance, the length provided can be applicable to each of the bitmaps corresponding to asserted flags. A single value that conveys the length may be applicable to each of the bitmaps. In some embodiments, a length per bitmap per flag may be conveyed as part of the data structure 700. In some embodiments, the plural lengths for the respective bitmaps may be conveyed with one or more additional data structures. For instance, if a total of 8 flags can be asserted, and three of those flags are asserted, three lengths are provided after the assertion flags field pertaining to the three bitmaps. In some embodiments, the length is provided after the assertion flags field.

The length of the bitmaps (e.g., the length pertaining to bitmaps corresponding to set or asserted flags) influences performance of the encoder and decoder. For instance, if a bitmap is provided for discardable pictures, one issue to address is whether the bitmap corresponds to prior pictures in a stream (e.g., last 32 pictures). If the encoder provided a bitmap for the prior 32 pictures, then the encoder does not need to incur a delay (though the decoder does, but the decoder may know or be informed that bitmap related information for those pictures is provided on a message in the stream that will shortly follow the received pictures), since as pictures are output from the encoder, the type of picture is noted and the bitmap (e.g., four (4) byte bitmap) can be provided at a time corresponding to the end of the output of the 32 picture from the encoder. On the other hand, if the bitmap is provided by the encoder for the next 32 pictures, the bitmap is to be provided with the (or at a time corresponding to) the output of the first picture, hence incurring a delay at the encoder (but no or insignificant delay at the decoder) to process the 32 pictures to enable the provision of the bitmap. Additionally, given the constraints of 188 bytes in an MPEG-2 transport packet, the adaptation field represents non-payload data, resulting in overhead that increases as the length of the bitmap increases. Hence, since the length of the bitmap is a compromise between delays incurred at the encoder and delays incurred at the decoder, and given the constraints of fixed-size transport packets, the size of the bitmap is determined in a manner that does not impose unnecessary delays at either device or consume unnecessary packet length.

An example data structure may comprise the format of an unsigned "char" for a byte corresponding to the number tiers (e.g., number of bits used as flags, such as in multiples of eight as one example among many). In some embodiments, the number of tiers is omitted, and replaced with one or more bytes or data fields of assertion flags. Once assertion flags are set, there is in one embodiment a predetermined order for providing the corresponding bitmaps in the specific message carrying the bitmap related information. For instance, bitmaps may be ordered after assertion flags field from top to bottom tier order. In some embodiments, they may be ordered from bottom to top tier.

In a top-down approach, the top tier of pictures are extracted, for instance, by DHCT 200 to effect a video playback mode, decoding, and outputting of the extracted pictures. Pictures may be also extracted from a video stream in a congested network, for instance at a router or switch or by other network processing equipment, to provide a sub-sequence of the video stream at a lower bit-rate As another example, refer to FIG. 8, which shows a data structure 800 of plural flag fields with the bits set (e.g., to "1" or "on") corresponding to the top tier flag 802, the second tier flag 804, and the last tier flag 806. Accordingly, three bit maps (of 16-bits each in length, for a total of 48 bits in this example) are provided, namely, the top tier bitmap 808 corresponding to top tier flag 802, a second tier bitmap 810 corresponding to the second tier flag 804, and a bottom tier bitmap 812 corresponding to the bottom tier flag 806. In one embodiment, the established order is from most important (top tier) to least important pictures (bottom tier). Thus, the top tier bitmap 808 is processed first, followed by the second tier bitmap 810 and then the last tier bitmap 812. The middle flags represent don't care conditions (e.g., set to zero), though in some embodiments, may be set or asserted.

As shown in FIG. 8, there are three bitmaps (808, 810, and 812) for the prior 16 pictures (or in some embodiments the following 16 pictures). As explained above, the bitmaps are provided in association with a single picture (versus providing for each picture in a transport stream). However, an issue of resumption arises, such as what is to be done for the next 16 pictures, described further below. Also to be addressed is an issue of association—how to associate the next 16 pictures with bitmaps. If the bitmaps for the next 16 pictures are provided in the next adaptation field, delays may be unacceptable, and the information provided may not correspond to the same tag as used for the prior 16 pictures. Further, the encoder changes, since there are scene changes, changes in locations of I pictures (e.g., GOPs in MPEG-2 change), and there are splice operations from a first video stream to a second stream, as when entering a commercial from a video program. In addition, the adaptation field is optional, and providing too frequently can result in inefficient compression. Further, the delays are prohibitive if information for too many pictures is placed in the adaptation field (to cover the prior 16 and future pictures or for too many pictures).

Similar to the concept that a decoder needs the ability to find the bitmap related information, the decoder needs the ability to identify or associate the pictures corresponding to the bitmap related information. In one embodiment, the association is accomplished in a predetermined manner (e.g., using existing transport stream mechanisms). In one embodiment, start codes may be used to identify where a picture begins. For instance, the beginning of a picture in a PES packet may be aligned with the beginning of the payload of a transport packet. Hence, the beginning of a picture can be identified to enable the extraction (for decoding or discarding) of pictures. In some embodiments, information available at the transport level enables the identification of the beginning of pictures. For instance, for MPEG-2 transport stream packets carrying a video stream, the payload unit start indicator, may identify when the transport stream packet payload begins with the first byte of an MPEG-2 PES packet. Once the location of the first picture is identified at a RAP, processing continues based on the bitmaps in sequential manner, in transmission order (e.g., the bitmaps list bit positions corresponding to pictures in transmission order).

Referring to FIG. 8, the bitmap 808 corresponds to the top tier pictures, and in this example has a length of 16 bits. The bitmap 810 corresponds to pictures in tier T2 (second tier from top), and also has a length of 16 bits. The bitmap 812 corresponds to the bottom tier (discardable) pictures, and has a length of 16 bits. The 16 bits of each bitmap 808, 810, and 812 correspond to 16 pictures for the given instance of pictures. Note that 16 blocks are shown in bitmap 808 to represent the 16 pictures, with a dotted line replacing many of those blocks in bitmaps 810 and 812 to represent the same number of blocks or pictures. Also, note that only a few blocks are represented as having a bit set, with the understanding that other blocks will either by set (e.g., 1) or not set (e.g., zero). Further, note that if a bit is set in a given tier, then the bit will be zero in all other bitmaps for the corresponding position. In other words, a picture can only have one bit turned on at most once among the bitmaps since a picture can only correspond to a single tier. For instance, bit position 814 (corresponding to a first picture) of bitmap 808 is set, whereas bit position 814 for bitmaps 810 and 812 are zero. Since bitmap 808 corresponds to top-tier pictures (e.g., I, IDR, forward predicted pictures), a bit set for one of the pictures (e.g., the first picture identified by bit position 814) reflects that fact that a top-tier picture is not found in the other tiers. Similarly, bit position 816 corresponding to a second picture in the sequence is set for bitmap 810, but zero for the same position in bitmaps 808 and 812. Likewise, bit position 818 is set for bitmap 818, and zero for bitmaps 808 and 810.

FIG. 8 also illustrates that the extraction of tier pictures can be accomplished in some embodiments through logical operations. For instance, employing a top-down approach, the bit positions of the top two tiers 808 and 810 can be subject to a logical OR operation, with the resulting pictures extracted possessing the characteristic that they are self-decodable (e.g., all picture interdependencies for referencing are satisfied).

In addition, if a bottom-up approach is employed, a determination can also be made as to which pictures are self decodable, even if provided with a single bitmap (e.g., bitmap 812). For instance, if a logical NOT is performed on bit positions of the bottom tier bitmap 812, the result is pictures that are decodable (since the pictures identified by the bit positions of the bottom tier bitmap 812 correspond to discardable pictures).

Further, if a bitmap is asserted corresponding to the second tier from the bottom of the hierarchy, a logical OR operation can be performed on the bottom tier and second tier from the bottom, and a logical NOT operation can be performed on the result of the logical OR operation to reveal self-decodable pictures.

Figure 9A:
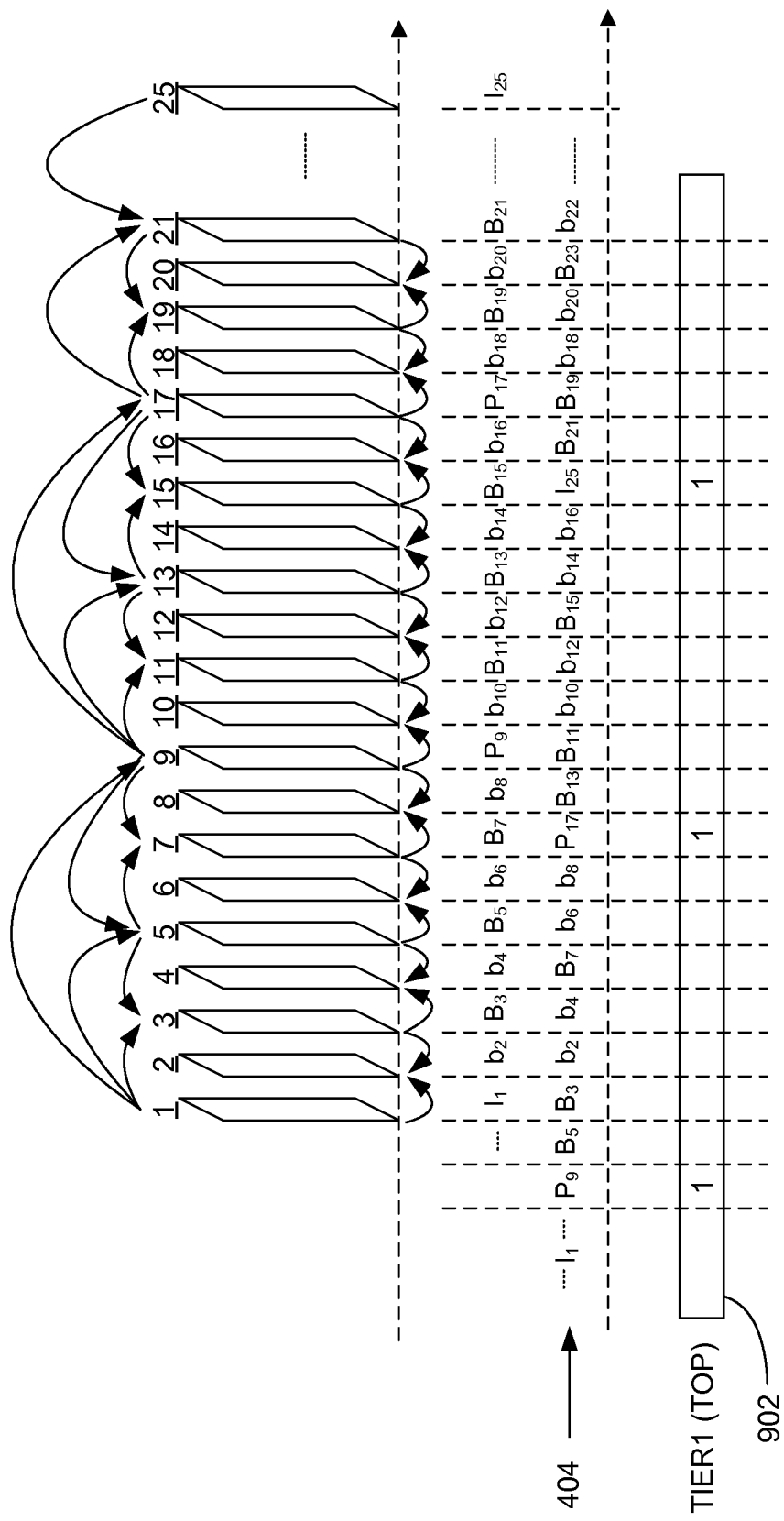
FIGS. 9A-9E are block diagrams that illustrate various bitmap configurations based on an example sequence of pictures as shown in FIG. 4A.

FIGS. 9A-9D are block diagrams that illustrates example bitmap configurations based on the sequence of compressed pictures in FIG. 4A. In FIG. 9A, a top tier (T1, using the convention shown in FIG. 5) bitmap 902 is shown with bits set (e.g., "1") at positions corresponding to top tier pictures $P_9$, $P_{17}$, and $I_{25}$). Note that the bit settings correspond to the transmission order of pictures. In one embodiment, an encoder (e.g., encoder 111) may provide tier 1 pictures exclusively.

Figure 9B:
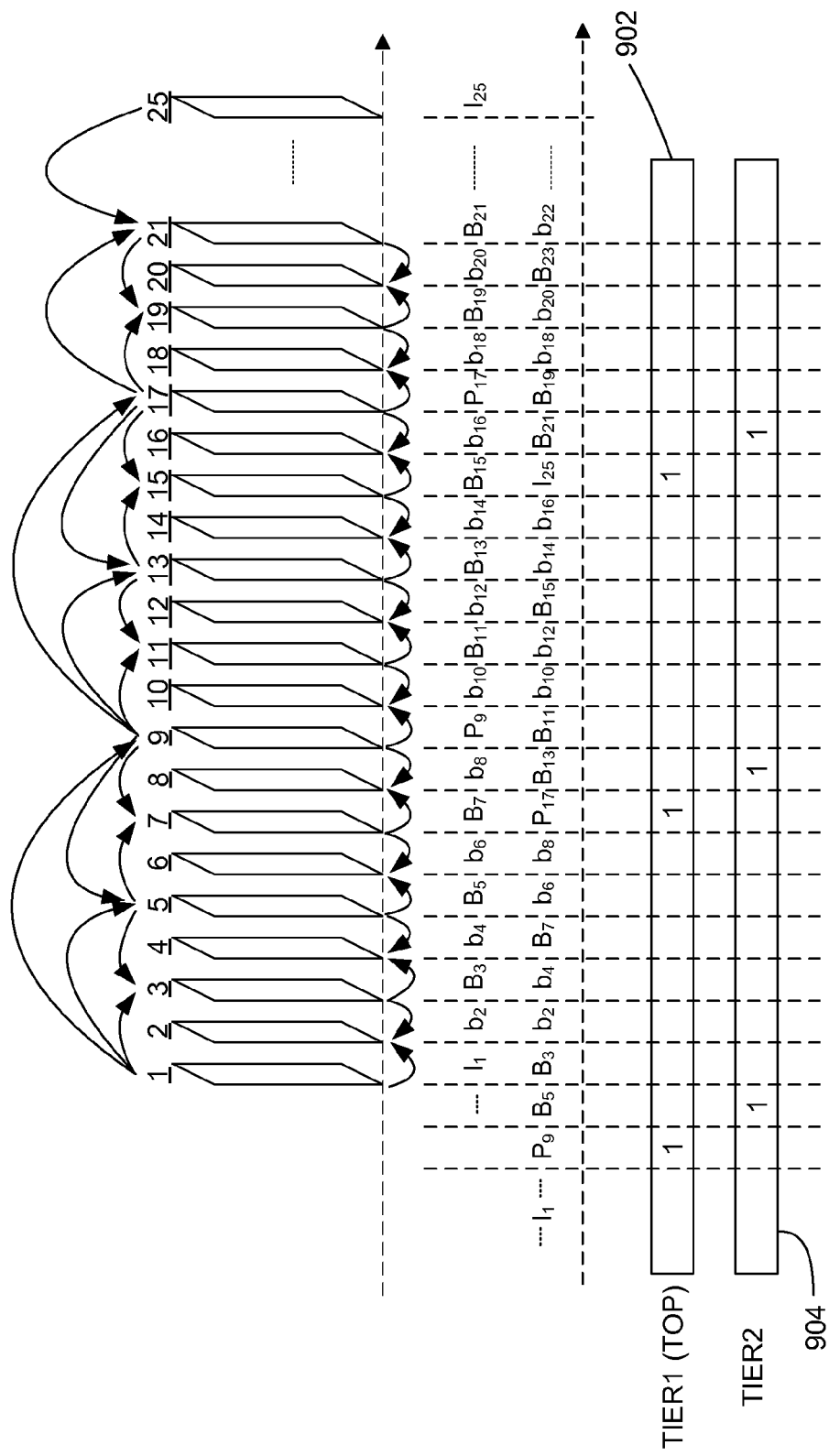

FIG. 9B is a block diagram that illustrates the provision of another bitmap 904 corresponding to second tier (T2) pictures $B_5$, $B_{13}$, and $B_{21}$ with the corresponding bits set. Note, as explained above, that bits are not set for the same pictures among different bitmaps given that pictures are associated exclusively with a given tier.

Figure 9C:
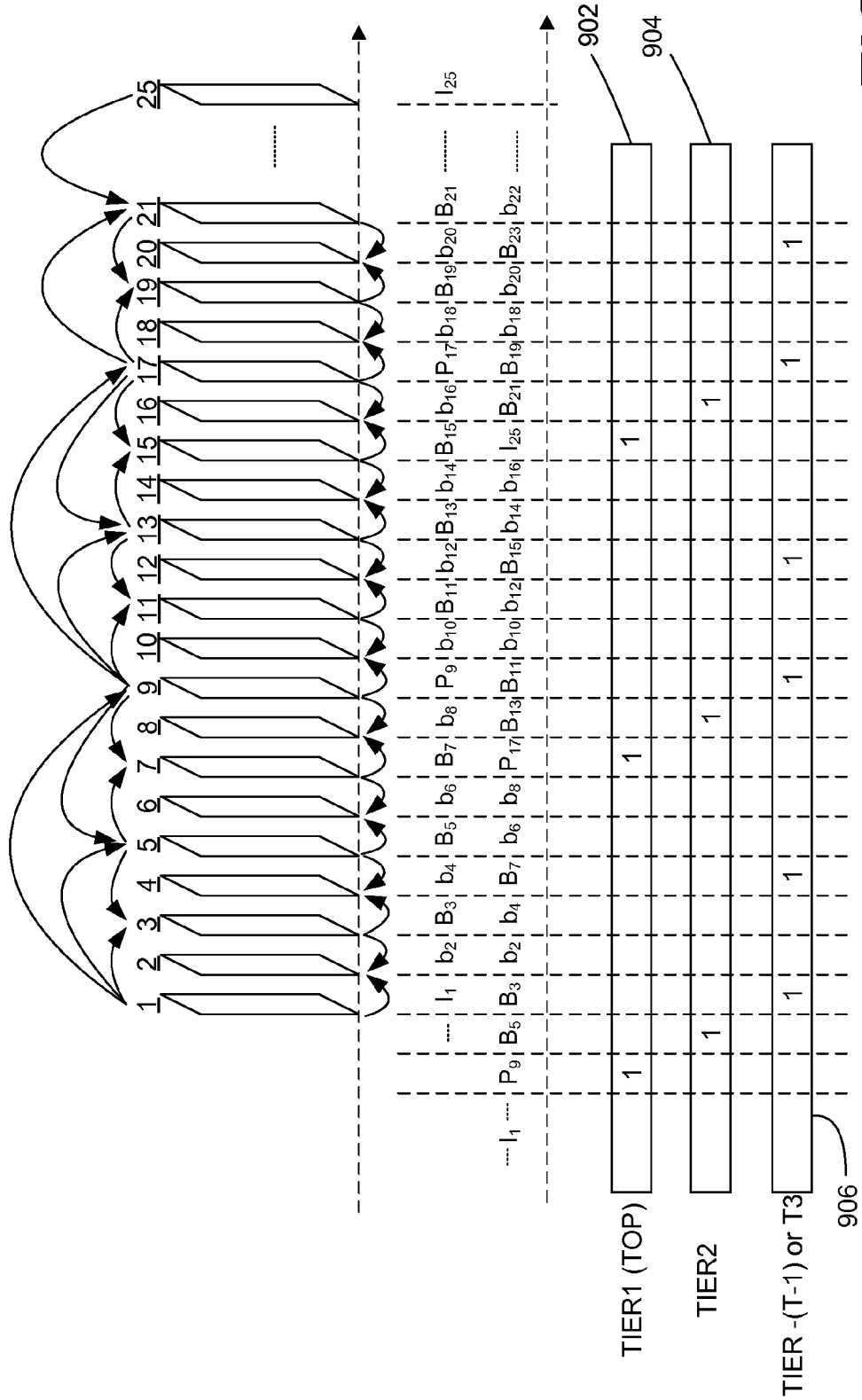

FIG. 9C adds another bitmap 906 corresponding to a third tier (T3), which in this example also corresponds to the second least important tier (e.g., —(T−1)). As shown, bits are set corresponding to T3 pictures $B_3$, $B_7$, $B_{15}$, $B_{15}$, $B_{19}$, and $B_{23}$.

Figure 9D:
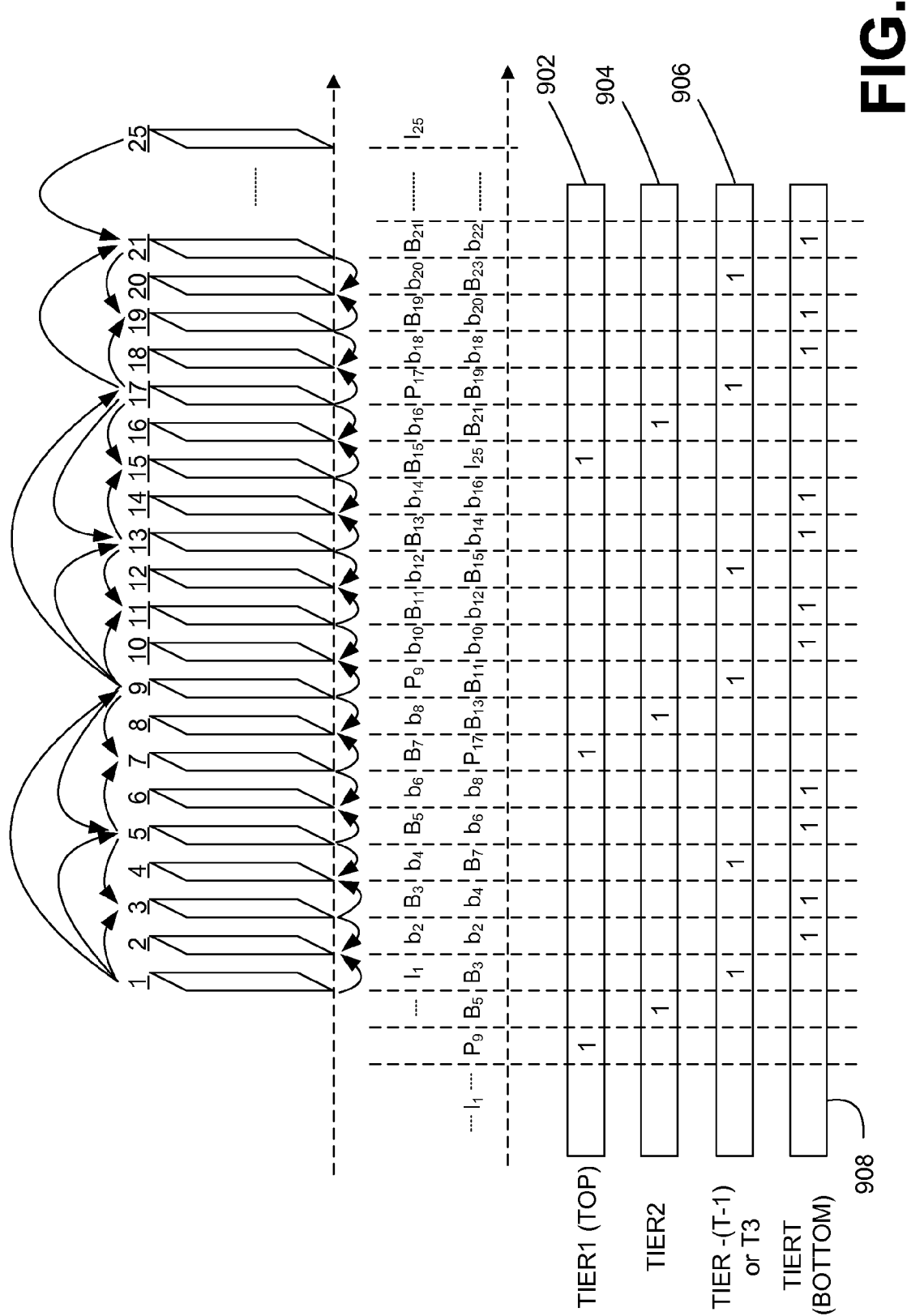

FIG. 9D adds another bitmap 908 with bits set for corresponding discardable (TierT) pictures $b_2$, $b_4$, $b_6$, $b_8$, $b_{10}$, $b_{12}$, $b_{14}$, $b_{16}$, $b_{18}$, $b_{20}$, and $b_{22}$. As explained above, no picture has more than one bit set among the plurality of bitmaps.

Figure 9E:
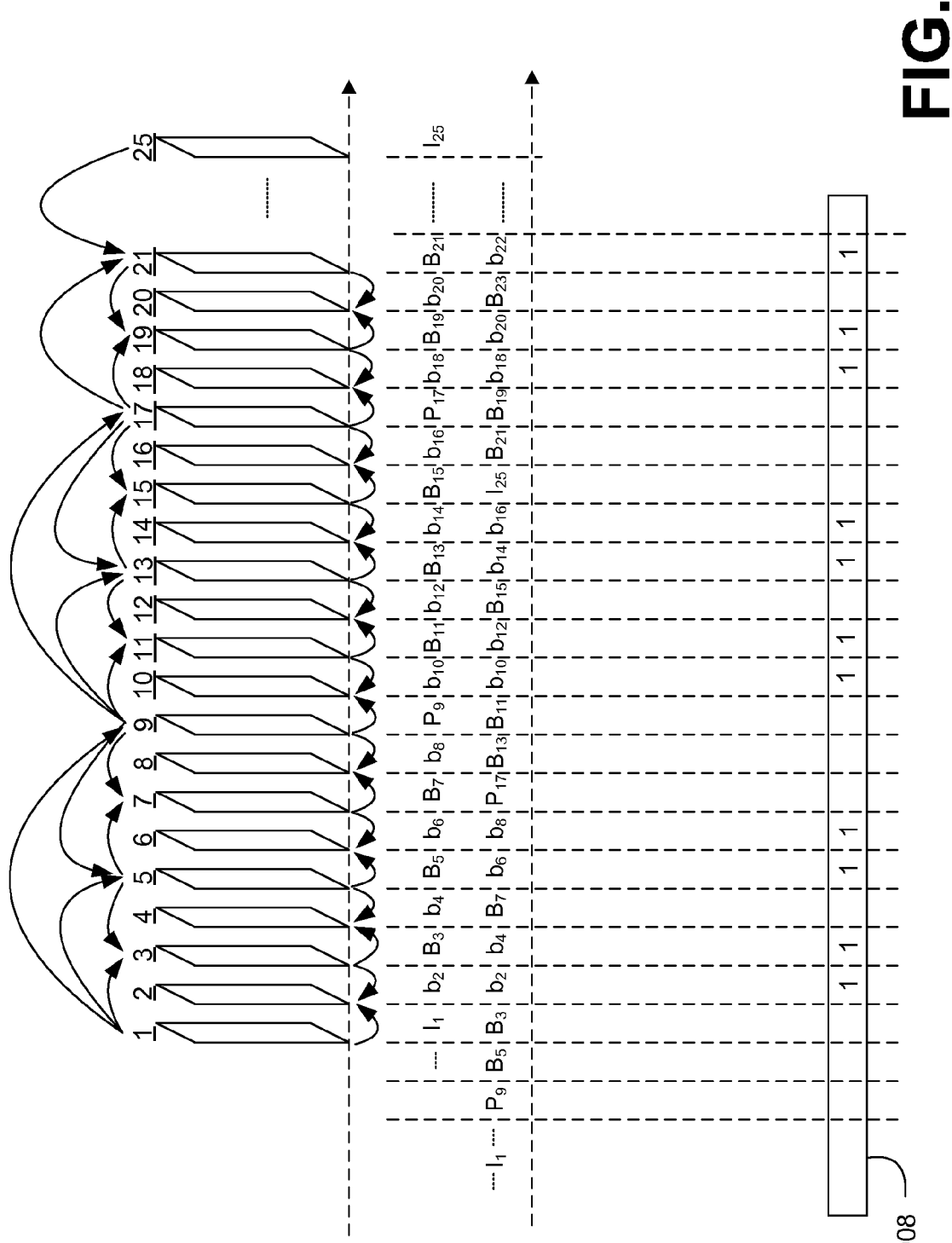

FIG. 9E illustrates one embodiment where the bitmap 908 is the only bitmap provided, facilitating the discarding of pictures (or the extraction of decodable pictures using a logical NOT operation as explained above).

Note that, though the above bitmaps are explained in the context of an AVC environment, MPEG-2 video, and in particular, MPEG-2 video GOPs are contemplated to be within the scope of the embodiments disclosed herein. For instance, a flag field similar to that shown in FIGS. 8 and 9 may have bits asserted (set) corresponding to a top tier bitmap and a bottom tier bitmap. The top tier bitmap may have bit positions set for I and P pictures (in transmission order), whereas the bottom tier bitmap (discardable, B, pictures) has the opposite bit settings (e.g., the exclusive OR of the top bitmap).

Note that in one embodiment, an additional field may be provided corresponding to the bitmap of the top tier pictures that represents at what point (or thereafter) a picture fully attains its intended decompressed version. For instance, as explained above, a byte may be used in the adaptation field to convey the number of tiers (data structure or flag field, such as 800 in FIG. 8), and another byte may be used that conveys at which point in the pictures (e.g., 16 pictures corresponding to an example bitmap), after decoding, one attains full reconstruction. Such a field may be helpful in circumstances where, for instance, a second RAP needs to be accessed before achieving full reconstruction.

One issue mentioned above pertains to resumption of bitmap related information. For instance, since bitmap related information is not provided with every picture, but instead, pertain to a sequence of pictures, the issues arises as to how the bitmap process is propagated for subsequent pictures. For purposes of the discussion that follows, an assumption is made that the bitmaps are 16 bits long (hence corresponding to 16 pictures), with the understanding that other bit lengths may be employed, fixed or variable, predetermined or otherwise. Processing generally begins at a RAP and hence in one embodiment, the bitmap is provided at each RAP. In one embodiment, bitmaps are always provided at the RAP. However, it does not necessarily follow that an SRAP will occur at every $16^{th}$ picture (for instance, RAPS may be 5 seconds or other values apart). In some embodiments, the bitmap is provided at every $16^{th}$ pictures (regardless of whether the $16^{th}$ picture is an RAP), assuming for instance a predetermined (or explicitly provided) bitmap length of 16 bits corresponding to 16 pictures. In some embodiments, bitmap related information may be provided while the prior bitmap related information is still active, such as when an RAP is provided prior to the expiration of the predetermined length of pictures (e.g., before the $16^{th}$ picture). In some embodiments, the provision of bitmap related information while the prior bitmap related information is still active (i.e., prior to its expiration of the predetermined length of pictures) results in a "clean-slate." In other words, assume the new provided bitmap related information becomes effective at the picture associated with the location of the video stream where the last bitmap related information is provided. For instance, if bitmap related information is provided at the $12^{th}$ picture, all bits of the bitmap corresponding to bit positions 12-16 (or 13-16 in some embodiments) are disregarded and the last arriving bitmap related information is employed for the next 16 pictures (or in some embodiments, for the remaining pictures).

In some embodiments, a requirement may be imposed where the pre-expiration bitmaps are only provided in a location of the video stream corresponding to or associated with a top tier picture, which such top tier picture is identified in the active bitmap related information with the bit of the bitmap corresponding to the top tier having a first value indicating that the picture is a top tier picture. In an alternate embodiment, bitmap related information cannot displace an active or current bitmap related information but at a location in the video stream corresponding to a top tier picture identified in the current bitmap related information.

In one embodiment, resumption of bitmap related information always occurs coincident with the last identified picture in the active bitmap related information that corresponds to the top tier. Furthermore, in this embodiment, the next bitmap related information may become active at the picture after the expiration of the current bitmap related information (after the $16^{th}$ picture). In some embodiments, a flag may indicate with a first and second value one of two activation points for the next bitmap related information, either at the expiration of the pictures corresponding to the current bitmap related information, or at the picture (e.g., a top tier picture) where the next bitmap related information is provided.

In some embodiments, processing can resume, or in some embodiments, resumption can occur at a different location. In some embodiments, a tier may be introduced (set) pre-expiration. In such circumstances, one embodiment requires aggregation, whereas in some embodiments, aggregation is not employed (e.g., no aggregation of a tier at random). One embodiment may require that there be a requirement that the accounting of all pictures remains consistent. In some embodiments, a RAP pre-expiration results in an expiration of the processing of the bitmap (e.g., allowance of gaps). Accordingly, the resumption or continuation of bitmap processing may continue according to one or more of these various options.

In some embodiments, a data structure containing the assertion flags field also contains an additional bit or field for conveying repeating the prior (e.g., just expired) bitmaps so that the bitmaps do not have to be retransmitted. For instance, in one embodiment, 5 bits are used for tiers (e.g., 5 tiers), and a sixth bit is used for signifying the repeating function. In one embodiment, two other bits are employed for four values of bitmap lengths (e.g., for the number of bytes in at the bitmap), such as follows:

00: a default (e.g., for 16 bits, though not limited as such)
01: 8 bits
02: 24 bits
03: 32 bits Accordingly, there is a default value (described above using 16 bits, with the understanding that other values may be used in some embodiments), and three alternate values, each a multiple, in one embodiment, of 8 bits.

In some embodiments, N consecutive bits in the assertion flags field are ordered to represent correspondence from top tier to bottom tier for a possible number of tiers greater than N. A maximum of N−1 tiers are asserted at any one time when bitmap related information is provided. This means that at least one of the N bits must be a second value (e.g., equal to "0") that does not assert the presence of a bitmap for a tier. Per the hierarchy of tiers properties, the location of the bit with the second value and the assertions for the presence of bitmaps are subject to the following:

1. A top tier (i.e., the presence of its bitmap) can only be asserted if all lower numbered tiers are also asserted. Hence, a bit from the N bits that corresponds to a top tier cannot have the first value (e.g., be equal to "1") unless the bits corresponding to all lower numbered tiers, if any, also have the first value.
2. A bottom tier can only be asserted if all higher numbered tiers are also asserted. Hence, a bit from the N bits that corresponds to a bottom tier cannot have the first value unless the bits corresponding to all higher numbered tiers, if any, also have the first value.
3. Since the number of tiers is greater than N, there must always be a bit with a second value. If any combination of top tiers and bottom tiers are asserted, there must be at least one bit with the second value within the N−2 middle (or center) bits of the N bits.

Allocation of which bit is set to zero depends, in some implementations, on the approach used for providing bitmap related information. For instance, in a top-down approach, all bits may be set to 1 except for the bottom tier bit. Similarly, if a bottom-up approach is implemented, all bits may be set to one except the top tier bit.

In some embodiments, one mechanism for signaling to repeat the bitmap related information used during the last active or provided bitmap related information is to use as a repeat flag a pattern for the N bits that is not allowed. For instance, if N=5 bits, the middle or center bit of the N bits can be set to the first value. Thus, in some embodiments, the repeat function can be signaled by an illegal pattern such as when "edge" bits pertaining to the most important and least important bits are zero.

Consider an example where each bitmap length is 16 bits, and only asserting five (of eight possible) tiers, with N=5. Repeat functionality can be signaled by using an illegal pattern (e.g., 00100, assuming a bottom-up or top-down approach). With the other 3 bits, eight different combinations or permutations are possible.

In some embodiments, the length of the bitmaps can be implied or derived from the value of the length field conveyed in the specific message that carries the bitmap related information. For instance, the bitmaps length can be derived by subtracting one byte from the value of the message's length field to account for the assertion flags, counting the number of bits in the assertion flags field ("B"), and then dividing by B.

In some embodiments, information pertaining to the picture interdependencies is provided without bitmaps. For instance, the information provided is merely a tier assertion field (or a tier assertion field when more than one byte is used) that includes M bits corresponding to M respective tiers, where M is less than or equal to eight. The M bits are ordered to represent M respective tiers from top tier to bottom tier. Only one of the M bits is allowed to have the first value (equal to "1") to assert the tier for the corresponding picture, which is the picture in the video stream associated with the location of the assertion flags field in the transport packet. For instance, similar to as described above, the tier assertion field may be provided in the adaptation field of the MPEG-2 Transport packet and the start of the header of the PES packet containing the corresponding picture may be located at the start of the payload of the same transport packet. Thus, a tier may be asserted for a single picture but not all pictures in the video stream need to be asserted. For instance, it may not be desirable or necessary to assert pictures belonging to middle tiers. In some embodiments, the picture associated with a RAP does not need to be asserted with the tier assertion byte since it can be assumed to belong to the top tier, Tier 1. In some embodiments, when the tier assertion byte is not required to assert the tier of the RAP picture, the tier assertion byte can represent the number of pictures away from the RAP picture where the next Tier I picture is located in the video stream.

In some embodiments, a bit of the tier assertion byte is assigned to convey a top tier assertion or a bottom tier assertion. In other words, a first value (e.g., "1") asserts a top tier assertion, and a second value a bottom tier assertion. A single bit from the M ordered bits asserts a tier for the picture. If a top tier assertion is made, the M ordered bits correspond to M respective bottom tiers, starting with the bottom tier. If a top tier assertion is made, the M ordered bits correspond to M respective top tiers, starting with the top tier.

In another embodiment, the tier assertion byte contains: (1) the bit to convey a top tier or a bottom tier assertion, the M bits corresponding to M respective tiers (as just described), and the next picture field. The next picture field identifies the location of the picture in the video stream that belongs to the same tier in the hierarchy as the asserted tier for the current picture. If the next picture field equals zero, it does not identify the location of a picture. A non-zero value in the next picture field corresponds to the number of pictures in the video stream from the current picture, in transmission order, and, thus, identifies the next picture belonging to the same tier as the current picture.

In some embodiments, such as embodiments that extend to the above embodiments discussing the tier assertion byte (or field), when a picture of interlaced video is coded as two fields in two separate PES packets a bit of the tier assertion byte (or equally tier assertion field), may identify whether the field is a bottom or a top field with two respective values. In some embodiments, yet another field may identify the relative location (e.g., in number of fields away from the current field) of the field that corresponds to the current picture that is being asserted as belonging to a tier.

Note that certain embodiments described herein include functionality residing in one or more locations, including at the DHCT, network devices, etc., the latter which may discard pictures because of network congestion, hence retaining top tier(s) pictures if the logic of such equipment "knew" that it was guaranteed that non-top tier pictures could be discarded and the top tier (which ever tier "n" it is) is guaranteed to be self decodable if all tier n pictures and above are retained. Additionally, in some embodiments, logic in such network equipment may perform the ascertaining methods described herein, hence obviating the need for encoding functionality in the DHCT to perform such functions.

Although operations are described with respect to a "picture," any other collection of data may be similarly used such a group of pictures, a block, macroblock, slice or other picture portion, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in some embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

The foregoing description of illustrated particular embodiments, including what is described in the Abstract, is not intended to be exhaustive or to limit the disclosure to the precise forms disclosed herein. While specific particular embodiments of various equivalent modifications are possible within the spirit and scope, as those skilled in the relevant art will recognize and appreciate. As indicated, these modifications may be made to the present systems and methods in light of the foregoing description of illustrated particular embodiments and are to be included within the scope of the disclosure.

Thus, while the various systems and methods has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope of the disclosure as set forth. Therefore, many modifications may be made to adapt a particular situation or material to the essential scope of the disclosure. It is intended that the various embodiments are not be limited to the particular terms used in following claims and/or to the particular embodiment disclosed as the best mode contemplated for carrying out the systems and methods, but that the certain embodiments will include any and all particular embodiments and equivalents falling within the scope of the appended claims.

The invention claimed is:

1. A method, comprising:
providing a video stream, wherein successive pictures in the video stream are provided in a transmission order; and
providing a first instance of plural flags, said plural flags associated respectively to plural picture interdependency tiers, wherein a first flag value in any of the plural provided flags asserts the presence of a field corresponding to a picture interdependency tier associated with the respective flag, wherein a picture of the video stream is associated to at most one interdependency tier, wherein a tier number for a picture represents hierarchy of decodability of the picture, and wherein the field corresponding to the picture interdependency tier is provided at a predetermined increment of pictures in the video stream.

2. The method of claim 1, further comprising:
providing a first set of fields, wherein the number of provided fields in the first set of fields corresponds to the number of plural provided flags having the first flag value in the first instance, wherein the first set of fields is associated with a first plurality of successive pictures in the video stream (FPOSPITVS), wherein each field of the first set of fields corresponds respectively to a respective picture interdependency tier, wherein each field of the first set of fields comprises of ordered sub-fields, wherein the first of the ordered sub-fields in each field of the first set of fields corresponds to the first picture in transmission order of the FPOSPITVS, wherein each successive ordered sub-field after the first sub-field in each field of the first set of fields correspond respectively to each successive picture in transmission order after the first picture of the FPOSPITVS, and wherein each of the successive pictures in the FPOSPITVS is identified by at most one corresponding ordered sub-field of the first set of fields.

3. The method of claim 2, further comprising:
providing a second plurality of successive pictures in the video stream (SPOSPITVS) after the FPOSPITVS, wherein the first provided picture of the SPOSPITVS is provided after the last provided picture of the FPOSPITVS.

4. The method of claim 3, further comprising providing a second instance of the plural flags.

5. The method of claim 4, further comprising providing a second set of fields, wherein the number of provided fields in the second set of fields corresponds to the number of plural provided flags having the first flag value, providing a second set of fields associated with the SPOSPITVS, wherein each of the second plurality of fields corresponds respectively to a picture interdependency tier, wherein each of the second plurality of fields comprise of ordered sub-fields, wherein the first of the ordered sub-fields in each of the second plurality of fields corresponds to the first picture in transmission order of the SPOSPITVS, wherein each successive ordered sub-field after the first sub-field in each of the second plurality of fields correspond respectively to each successive picture in transmission order after the first picture of the SPOSPITVS, and wherein each of the successive pictures in the SPOSPITVS is identified by at most one of its corresponding plural ordered sub-fields of the second plurality fields.

6. A method, comprising:
receiving a video stream;
processing of compressed video and information identifying pictures corresponding to respective interdependency tiers wherein provided flags associate respectively to the interdependency tiers, wherein a first flag value in any of the plural provided flags asserts the presence of a field corresponding to an interdependency tier associated with the respective flag, wherein a picture of the video stream is associated to at most one interdependency tier, wherein a tier number for a picture represents hierarchy of decodability of the picture, and wherein the field corresponding to the picture interdependency tier is provided at a predetermined increment of pictures in the video stream; and processing bitmap related information for interdependency tiers above a certain tier in a hierarchy.

7. The method of claim 6, wherein receiving the video stream further comprises receiving the information that identifies the pictures in the video stream, wherein the pictures comprise compressed pictures.

8. The method of claim 7, further comprising extracting one or more of the identified pictures from the video stream.

9. A method, comprising:
providing a video stream;
providing information identifying compressed pictures in the video stream corresponding to respective picture interdependency tiers, wherein the provided information comprises flags associated respectively to the interdependency tiers, wherein a first flag value in any of the plural provided flags asserts the presence of a field corresponding to an interdependency tier associated with the respective flag, wherein a picture of the video stream is associated to at most one interdependency tier, wherein a tier number for a picture represents hierarchy of decodability of the picture, and wherein the field corresponding to the picture interdependency tier is provided at a predetermined increment of pictures in the video stream; and providing bitmap related information for interdependency tiers above a certain tier in a hierarchy.

10. The method of claim 1, wherein the field corresponding to the picture interdependency tier is provided at every $16^{th}$ picture the video stream.

11. The method of claim 1, wherein the field corresponding to the picture interdependency tier is provided at every $32^{nd}$ picture the video stream.

12. The method of claim 1, wherein a length of the field corresponding to the picture interdependency tier is fixed.

13. The method of claim 1, wherein a length of the field corresponding to the picture interdependency tier is variable and is based on a number of tiers present in the video stream.

14. The method of claim 1, wherein the field corresponding to the picture interdependency tier is provided at a location of the video stream corresponding to a random access point (RAP).

* * * * *